US008082148B2

(12) United States Patent
Agapi et al.

(10) Patent No.: US 8,082,148 B2
(45) Date of Patent: Dec. 20, 2011

(54) TESTING A GRAMMAR USED IN SPEECH RECOGNITION FOR RELIABILITY IN A PLURALITY OF OPERATING ENVIRONMENTS HAVING DIFFERENT BACKGROUND NOISE

(75) Inventors: Ciprian Agapi, Lake Worth, FL (US); William K. Bodin, Austin, TX (US); Charles W. Cross, Jr., Wellington, FL (US); Michael H. Mirt, Deerfield Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 869 days.

(21) Appl. No.: 12/109,204

(22) Filed: Apr. 24, 2008

(65) Prior Publication Data

US 2009/0271189 A1 Oct. 29, 2009

(51) Int. Cl.
*G10L 15/20* (2006.01)

(52) U.S. Cl. ........ 704/233; 704/231; 704/236; 704/243; 704/255

(58) Field of Classification Search .................. 704/233, 704/236, 231, 243, 255
See application file for complete search history.

(56) References Cited

U.S. PATENT DOCUMENTS

| 5,577,165 | A |  | 11/1996 | Takebayashi et al. |  |
|---|---|---|---|---|---|
| 5,584,052 | A |  | 12/1996 | Galau et al. |  |
| 5,969,717 | A |  | 10/1999 | Ikemoto |  |
| 6,009,391 | A | * | 12/1999 | Asghar et al. | 704/243 |
| 6,125,345 | A | * | 9/2000 | Modi et al. | 704/240 |
| 6,128,595 | A | * | 10/2000 | Ruber | 704/255 |
| 6,208,972 | B1 |  | 3/2001 | Grant et al. |  |
| 6,243,375 | B1 |  | 6/2001 | Speicher |  |
| 6,275,806 | B1 |  | 8/2001 | Pertrushin |  |
| 6,301,560 | B1 |  | 10/2001 | Masters |  |

(Continued)

FOREIGN PATENT DOCUMENTS

CN 1385783 12/2002

(Continued)

OTHER PUBLICATIONS

Axelsson, et al.; "XHTML+Voice Profile 1.2" Internet, [Online] Mar. 16, 2004 (Mar. 6, 2004), pp. 1-53, XP002484188 Retrieved from the Internet: URL: http://www.voicexml.org/specs/mutlimodal/x+v/12/spec.html [retrieved on Jun. 12, 2008].

(Continued)

*Primary Examiner* — Qi Han
(74) *Attorney, Agent, or Firm* — Wolf, Greenfield & Sacks, P.C.

(57) ABSTRACT

Methods, systems, and products for testing a grammar used in speech recognition for reliability in a plurality of operating environments having different background noise that include: receiving recorded background noise for each of the plurality of operating environments; generating a test speech utterance for recognition by a speech recognition engine using a grammar; mixing the test speech utterance with each recorded background noise, resulting in a plurality of mixed test speech utterances, each mixed test speech utterance having different background noise; performing, for each of the mixed test speech utterances, speech recognition using the grammar and the mixed test speech utterance, resulting in speech recognition results for each of the mixed test speech utterances; and evaluating, for each recorded background noise, speech recognition reliability of the grammar in dependence upon the speech recognition results for the mixed test speech utterance having that recorded background noise.

18 Claims, 7 Drawing Sheets

U.S. PATENT DOCUMENTS

| | | |
|---|---|---|
| 6,513,011 B1 | 1/2003 | Uwakubo |
| 6,606,599 B2 | 8/2003 | Grant et al. |
| 6,856,960 B1 | 2/2005 | Dragosh et al. |
| 6,920,425 B1 | 7/2005 | Will et al. |
| 6,999,930 B1 | 2/2006 | Roberts et al. |
| 7,035,805 B1 | 4/2006 | Miller |
| 7,171,243 B2 | 1/2007 | Watanabe et al. |
| 7,188,067 B2 | 3/2007 | Grant et al. |
| 7,330,890 B1 | 2/2008 | Partovi et al. |
| 7,376,586 B1 | 5/2008 | Partovi et al. |
| 7,487,085 B2 | 2/2009 | Ativanichayaphong et al. |
| 7,509,569 B2 | 3/2009 | Barrus et al. |
| 2002/0065944 A1 | 5/2002 | Hickey et al. |
| 2002/0092019 A1 | 7/2002 | Marcus |
| 2002/0099553 A1 | 7/2002 | Brittan et al. |
| 2002/0120554 A1 | 8/2002 | Vega |
| 2002/0147593 A1 | 10/2002 | Lewis et al. |
| 2002/0184610 A1 | 12/2002 | Chong et al. |
| 2003/0039341 A1 | 2/2003 | Burg et al. |
| 2003/0046316 A1 | 3/2003 | Gergic et al. |
| 2003/0046346 A1 | 3/2003 | Mumick et al. |
| 2003/0101451 A1 | 5/2003 | Bentolila et al. |
| 2003/0125945 A1 | 7/2003 | Doyle |
| 2003/0179865 A1 | 9/2003 | Stillman et al. |
| 2003/0182622 A1 | 9/2003 | Sibal et al. |
| 2003/0195739 A1 | 10/2003 | Washio |
| 2003/0217161 A1 | 11/2003 | Balasuriya |
| 2003/0229900 A1 | 12/2003 | Reisman |
| 2003/0235282 A1 | 12/2003 | Sichelman et al. |
| 2004/0019487 A1 | 1/2004 | Kleindienst et al. |
| 2004/0025115 A1 | 2/2004 | Seinel et al. |
| 2004/0031058 A1 | 2/2004 | Reisman |
| 2004/0044516 A1 | 3/2004 | Kennewick et al. |
| 2004/0049390 A1 | 3/2004 | Brittan et al. |
| 2004/0059705 A1 | 3/2004 | Wittke et al. |
| 2004/0083109 A1 | 4/2004 | Halonen et al. |
| 2004/0120472 A1 | 6/2004 | Popay et al. |
| 2004/0120476 A1 | 6/2004 | Harrison et al. |
| 2004/0122665 A1* | 6/2004 | Huang et al. ............... 704/227 |
| 2004/0138890 A1 | 7/2004 | Ferrans et al. |
| 2004/0153323 A1 | 8/2004 | Charney et al. |
| 2004/0179038 A1 | 9/2004 | Blattner et al. |
| 2004/0216036 A1 | 10/2004 | Chu et al. |
| 2004/0236574 A1 | 11/2004 | Ativanichayaphong |
| 2004/0260562 A1 | 12/2004 | Kijirai |
| 2005/0075884 A1 | 4/2005 | Badt |
| 2005/0091059 A1 | 4/2005 | Lecoeuche |
| 2005/0131701 A1 | 6/2005 | Cross |
| 2005/0138219 A1 | 6/2005 | Boughannam |
| 2005/0138647 A1 | 6/2005 | Boughannam |
| 2005/0154580 A1 | 7/2005 | Horowitz et al. |
| 2005/0160461 A1 | 7/2005 | Baumgartner et al. |
| 2005/1888412 | 8/2005 | Dacosta |
| 2005/0203729 A1 | 9/2005 | Roth et al. |
| 2005/0203747 A1 | 9/2005 | Lecoeuche |
| 2005/0261908 A1 | 11/2005 | Cross |
| 2005/0273769 A1 | 12/2005 | Eichenberger |
| 2005/0283367 A1 | 12/2005 | Ativanichayaphong et al. |
| 2006/0047510 A1 | 3/2006 | Ativanichayaphong et al. |
| 2006/0064302 A1 | 3/2006 | Ativanichayaphong et al. |
| 2006/0069564 A1 | 3/2006 | Allison et al. |
| 2006/0074680 A1 | 4/2006 | Cross |
| 2006/0075120 A1 | 4/2006 | Smit |
| 2006/0111906 A1 | 5/2006 | Cross |
| 2006/0122836 A1 | 6/2006 | Cross |
| 2006/0123358 A1 | 6/2006 | Lee et al. |
| 2006/0136222 A1 | 6/2006 | Cross |
| 2006/0146728 A1 | 7/2006 | Engelsma et al. |
| 2006/0168095 A1 | 7/2006 | Sharma et al. |
| 2006/0168595 A1 | 7/2006 | McArdle |
| 2006/0184626 A1 | 8/2006 | Agapi |
| 2006/0190264 A1 | 8/2006 | Jaramillo |
| 2006/0218039 A1 | 9/2006 | Johnson |
| 2006/0229880 A1 | 10/2006 | White |
| 2006/0235694 A1 | 10/2006 | Cross |
| 2006/0287845 A1 | 12/2006 | Cross et al. |
| 2006/0287865 A1 | 12/2006 | Cross et al. |
| 2006/0287866 A1 | 12/2006 | Cross et al. |
| 2006/0288309 A1 | 12/2006 | Cross et al. |
| 2007/0265851 A1 | 11/2007 | Ben-David et al. |
| 2007/0274296 A1 | 11/2007 | Cross et al. |
| 2007/0274297 A1 | 11/2007 | Cross et al. |
| 2007/0288241 A1 | 12/2007 | Cross et al. |
| 2007/0294084 A1 | 12/2007 | Cross |
| 2008/0065386 A1 | 3/2008 | Cross et al. |
| 2008/0065387 A1 | 3/2008 | Cross et al. |
| 2008/0065388 A1 | 3/2008 | Cross et al. |
| 2008/0065389 A1 | 3/2008 | Cross et al. |
| 2008/0065390 A1 | 3/2008 | Ativanichayaphong et al. |
| 2008/0086564 A1 | 4/2008 | Putman et al. |
| 2008/0140410 A1 | 6/2008 | Ativanichayaphong et al. |
| 2008/0162136 A1 | 7/2008 | Agapi et al. |
| 2008/0177530 A1 | 7/2008 | Cross et al. |
| 2008/0195393 A1 | 8/2008 | Cross et al. |
| 2008/0208584 A1 | 8/2008 | Ativanichayaphong et al. |
| 2008/0208585 A1 | 8/2008 | Ativanichayaphong et al. |
| 2008/0208586 A1 | 8/2008 | Ativanichayaphong et al. |
| 2008/0208587 A1 | 8/2008 | Ben-David et al. |
| 2008/0208588 A1 | 8/2008 | Ativanichayaphong et al. |
| 2008/0208589 A1 | 8/2008 | Cross et al. |
| 2008/0208590 A1 | 8/2008 | Cross |
| 2008/0208591 A1 | 8/2008 | Ativanichayaphong et al. |
| 2008/0208592 A1 | 8/2008 | Cross et al. |
| 2008/0208593 A1 | 8/2008 | Ativanichayaphong et al. |
| 2008/0208594 A1 | 8/2008 | Cross et al. |
| 2008/0228494 A1 | 9/2008 | Cross et al. |
| 2008/0228495 A1 | 9/2008 | Cross et al. |
| 2008/0235021 A1 | 9/2008 | Cross et al. |
| 2008/0235022 A1 | 9/2008 | Bergl et al. |
| 2008/0235027 A1 | 9/2008 | Cross |
| 2008/0235029 A1 | 9/2008 | Cross et al. |
| 2008/0249770 A1* | 10/2008 | Kim et al. ............... 704/231 |
| 2008/0249782 A1 | 10/2008 | Ativanichayaphong et al. |
| 2008/0255850 A1 | 10/2008 | Cross et al. |
| 2008/0255851 A1 | 10/2008 | Ativanichayaphong et al. |
| 2009/0271188 A1 | 10/2009 | Agapi et al. |
| 2009/0271199 A1 | 10/2009 | Agapi et al. |
| 2009/0271438 A1 | 10/2009 | Agapi et al. |

FOREIGN PATENT DOCUMENTS

| | | |
|---|---|---|
| CN | 1385783 A | 12/2002 |
| CN | 1564123 A | 1/2005 |
| EP | 0794670 A | 9/1997 |
| EP | 1450350 | 8/2004 |
| JP | 2000155529 A | 6/2000 |
| JP | 02003140672 A | 5/2003 |
| WO | WO 99/48088 | 9/1999 |
| WO | WO 0051106 A | 8/2000 |
| WO | WO 02/32140 A | 4/2002 |
| WO | WO 2004/062945 A | 7/2004 |
| WO | WO2006108795 | 10/2006 |

OTHER PUBLICATIONS

W3C: "Voice Extensible Markup Language (VoiceXML) Version 2.0" Internet Citation, [Online] XP002248286 Retrieved from the Internet: URL:http://www.w3.org/TR/voicexml20 [retrieved on Jul. 18, 2003].

W3C: "Voice Extensible Markup Language (VoiceXML) 2.1, W3C Candidate Recommendation Jun. 13, 2005" Internet, [Online] Jun. 13, 2005 (2005-16-13), pp. 1-34, XP002484189 Retrieved from the Internet: URL:http://www.w3.org/TR/2005/CR-voicexml21-20050613/ [retrieved on Jun. 12, 2008].

PCT Search Report, Jun. 25, 2008; PCT Application No. ; PCT/EP2008/051358.

PCT Search Report, Jun. 18, 2008; PCT Application No. ; PCT/EP2008/051363.

Didier Guillevic, et al.,Robust Semantic Confidence Scoring ICSLP 2002: 7th International Conference On Spoken Language Processing. Denver Colorado, Sep. 16-20, 2002 International Conference on Spoken Language Processing (ICSLP), Adelaide: Causal Productions, AI, Sep. 16, 2002, p. 853, XP007011561 ISBN:9788-1-876346-40-9.

U.S. Appl. No. 10/919,005, filed Dec. 2005, Eichenberger, et al.

U.S. Appl. No. 12/109,214, filed Apr. 2008, Agapi et al.

* cited by examiner

TESTING A GRAMMAR USED IN SPEECH RECOGNITION FOR RELIABILITY IN A PLURALITY OF OPERATING ENVIRONMENTS HAVING DIFFERENT BACKGROUND NOISE

BACKGROUND OF THE INVENTION

1. Field of the Invention

The field of the invention is data processing, or, more specifically, methods, apparatus, and products for testing a grammar used in speech recognition for reliability in a plurality of operating environments having different background noise.

2. Description of Related Art

User interaction with applications running on small devices through a keyboard or stylus has become increasingly limited and cumbersome as those devices have become increasingly smaller. In particular, small handheld devices like mobile phones and PDAs serve many functions and contain sufficient processing power to support user interaction through multimodal access, that is, by interaction in non-voice modes as well as voice mode. Devices which support multimodal access combine multiple user input modes or channels in the same interaction allowing a user to interact with the applications on the device simultaneously through multiple input modes or channels. The methods of input include speech recognition, keyboard, touch screen, stylus, mouse, handwriting, and others. Multimodal input often makes using a small device easier.

Multimodal applications are often formed by sets of markup documents served up by web servers for display on multimodal browsers. A 'multimodal browser,' as the term is used in this specification, generally means a web browser capable of receiving multimodal input and interacting with users with multimodal output, where modes of the multimodal input and output include at least a speech mode. Multimodal browsers typically render web pages written in XHTML+Voice ('X+V'). X+V provides a markup language that enables users to interact with an multimodal application often running on a server through spoken dialog in addition to traditional means of input such as keyboard strokes and mouse pointer action. Visual markup tells a multimodal browser what the user interface is look like and how it is to behave when the user types, points, or clicks. Similarly, voice markup tells a multimodal browser what to do when the user speaks to it. For visual markup, the multimodal browser uses a graphics engine; for voice markup, the multimodal browser uses a speech engine. X+V adds spoken interaction to standard web content by integrating XHTML (eXtensible Hypertext Markup Language) and speech recognition vocabularies supported by VoiceXML. For visual markup, X+V includes the XHTML standard. For voice markup, X+V includes a subset of VoiceXML. For synchronizing the VoiceXML elements with corresponding visual interface elements, X+V uses events. XHTML includes voice modules that support speech synthesis, speech dialogs, command and control, and speech grammars. Voice handlers can be attached to XHTML elements and respond to specific events. Voice interaction features are integrated with XHTML and can consequently be used directly within XHTML content.

In addition to X+V, multimodal applications also may be implemented with Speech Application Tags ('SALT'). SALT is a markup language developed by the Salt Forum. Both X+V and SALT are markup languages for creating applications that use voice input/speech recognition and voice output/speech synthesis. Both SALT applications and X+V applications use underlying speech recognition and synthesis technologies or 'speech engines' to do the work of recognizing and generating human speech. As markup languages, both X+V and SALT provide markup-based programming environments for using speech engines in an application's user interface. Both languages have language elements, markup tags, that specify what the speech-recognition engine should listen for and what the synthesis engine should "say." Whereas X+V combines XHTML, VoiceXML, and the XML Events standard to create multimodal applications, SALT does not provide a standard visual markup language or eventing model. Rather, it is a low-level set of tags for specifying voice interaction that can be embedded into other environments. In addition to X+V and SALT, multimodal applications may be implemented in Java with a Java speech framework, in C++, for example, and with other technologies and in other environments as well.

Current multimodal applications support a voice mode of user interaction using a speech engine. A speech engine provides speech recognition though use of a grammar. A grammar communicates to the speech engine the potential words or sequences of words that the speech engine may recognized when processing a user's speech. That is, the grammar narrows the set of potential results returned by the speech engine when performing speech recognition to reduce the amount of processing performed by the speech engine. Rather than having to determine which of all possible words in a language matches the user's speech, the speech engine may utilize a grammar to reduce the determination to which of a subset of those words in a language matches the user's speech.

Deployment of such multimodal applications onto multimodal devices generally includes extensive testing and tuning of the speech recognition grammars in the ambient noise environment where the application will be used. Because multimodal devices generally operate in a variety of different environments, each grammar must be tested and tuned for each operating environment in which the grammar may be utilized. For example, if there are m number of grammars that need to be tested in n number of operating environments, completely testing the grammars in all of the operating environments requires m×n recordings of the user's response to application prompts using the grammars for recognition in the different operating environments. The drawback to current methods of testing a grammar is that performing m number of tests in n operating environments is often prohibitively expensive.

SUMMARY OF THE INVENTION

Methods, systems, and products for testing a grammar used in speech recognition for reliability in a plurality of operating environments having different background noise that include: receiving recorded background noise for each of the plurality of operating environments; generating a test speech utterance for recognition by a speech recognition engine using a grammar; mixing the test speech utterance with each recorded background noise, resulting in a plurality of mixed test speech utterances, each mixed test speech utterance having different background noise; performing, for each of the mixed test speech utterances, speech recognition using the grammar and the mixed test speech utterance, resulting in speech recognition results for each of the mixed test speech utterances; and evaluating, for each recorded background noise, speech recognition reliability of the grammar in dependence upon the speech recognition results for the mixed test speech utterance having that recorded background noise.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
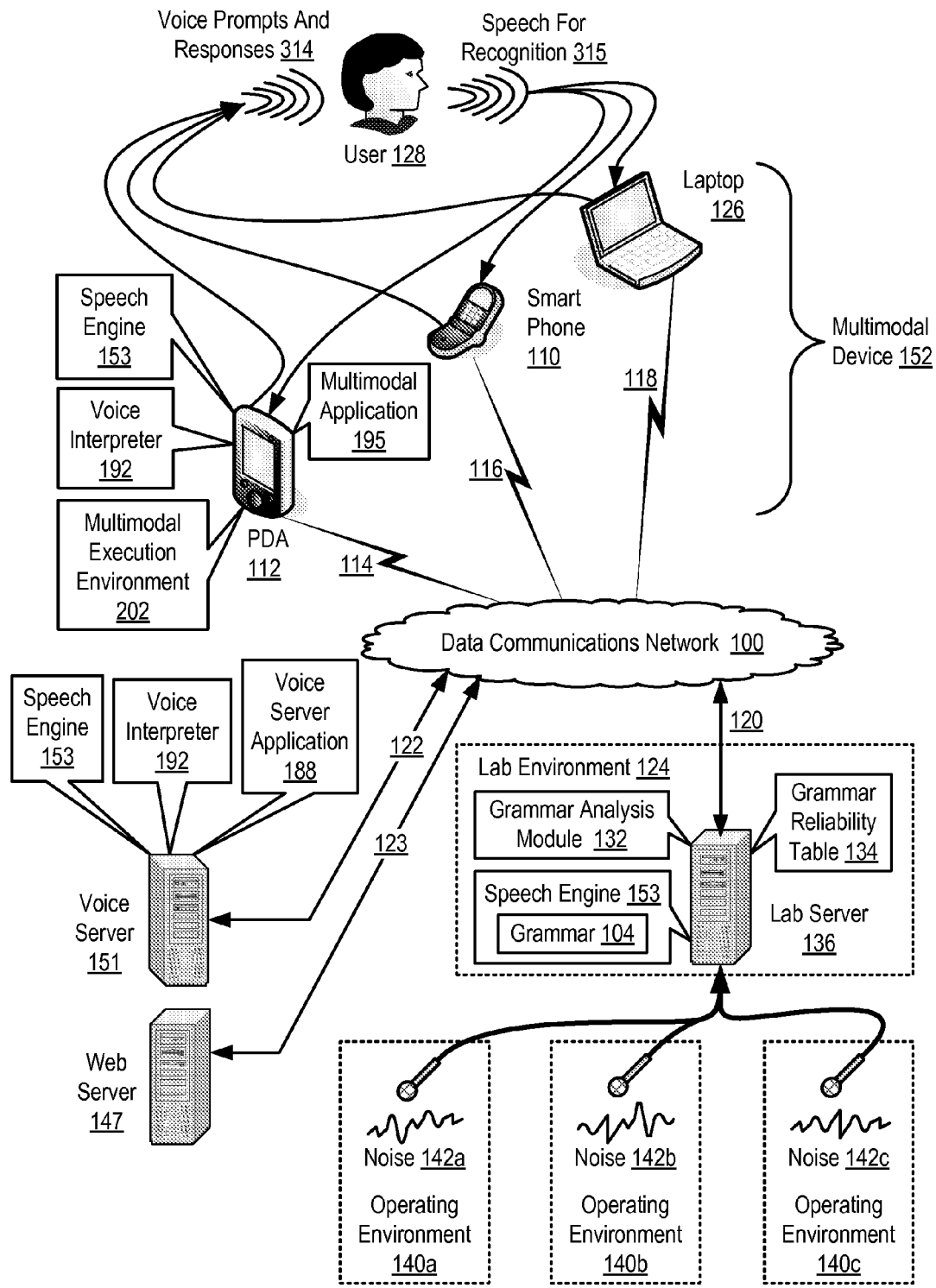
FIG. 1 sets forth a network diagram illustrating an exemplary system for testing a grammar used in speech recognition for reliability in a plurality of operating environments having different background noise according to embodiments of the present invention.

Exemplary methods, apparatus, and products for testing a grammar used in speech recognition for reliability in a plurality of operating environments having different background noise according to embodiments of the present invention are described with reference to the accompanying drawings, beginning with FIG. 1. FIG. 1 sets forth a network diagram illustrating an exemplary system for testing a grammar (104) used in speech recognition for reliability in a plurality of operating environments (140) having different background noise (142) according to embodiments of the present invention. Each operating environment (140) is an environment in which multimodal devices (152) operate and interact with a user (128) through a voice mode of user interaction. Each operating environment (140) may be implemented as a house, work, a car, a street, and so on. Each operating environment (140), however, typically encompasses more than just a mere location at which the multimodal device (152) operates. The operating environment may also be characterized by other factors that influence the environment surrounding the device at a particular location. For example, an operating environment may be implemented as the inside of a car traveling at thirty miles per hour, while another operating environment may be implemented as the inside of the same car traveling at ninety miles per hour.

Each operating environment (140) of FIG. 1 has a background noise (142). Specifically, the operating environment (140a) has a background noise (142a). The operating environment (140b) has a background noise (142b). The operating environment (140c) has a background noise (142c). Each background noise (142) of FIG. 1 represents the waveform of the background sounds for a different operating environment (140). The background sounds for each operating environment may include any sounds that occur in that operating environment excluding the user's speech while interacting with a multimodal device. The background noise (142) may be implemented as a frequency domain representation of the background sounds. For example, each background noise (142) may be characterized as the first twelve or thirteen Fourier or frequency domain components of a sample of the background sound waveform for a particular operating environment (140).

In the example of FIG. 1, the grammar (104) is tested in a laboratory environment (124). The laboratory environment (124) is an environment utilized to test a grammar used in speech recognition for reliability in a plurality of operating environments (140) having different background noise (142) according to embodiments of the present invention. The laboratory environment (124) includes a laboratory server (136) connected to a network (100) through wireline connection (120).

The laboratory server (136) of FIG. 1 has installed upon it a speech engine (153) performs speech recognition using the grammar (104). The grammar (104) communicates to the speech engine (153) the words and sequences of words eligible for speech recognition. Grammars tested for reliability in a plurality of operating environments having different background noise according to embodiments of the present invention may be expressed in any format supported by any speech engine, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V<form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
    #JSGF V1.0;
    grammar command;
    <command> = [remind me to] call | phone | telephone <name>
    <when>;
    <name> = bob | martha | joe | pete | chris | john | artoush | tom;
    <when> = today | this afternoon | tomorrow | next week;
]]>
</grammar>
```

In this example, the elements named <command>, <name>, and <when> are rules of the grammar. Rules are a combination of a rule name and an expansion of a rule that advises a speech engine or a voice interpreter which words presently can be recognized. In this example, expansion includes conjunction and disjunction, and the vertical bars '|' mean 'or.' A speech engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or chris' or 'john' or 'artoush' or 'tom', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

In the example of FIG. 1, the laboratory server (136) has installed upon it a grammar analysis module (132). The grammar analysis module (132) of FIG. 1 includes a set of computer program instructions capable of testing a grammar used in speech recognition for reliability in a plurality of operating environments having different background noise according to embodiments of the present invention. The grammar analysis module (132) of FIG. 1 operates generally for testing a grammar used in speech recognition for reliability in a plurality of operating environments having different background noise according to embodiments of the present invention by: receiving recorded background noise (142) for each of the plurality of operating environments (140); generating a test speech utterance for recognition by the speech recognition engine (153) using the grammar (104); mixing the test speech utterance with each recorded background noise (142), resulting in a plurality of mixed test speech utterances, each mixed test speech utterance having different background noise (142); performing, for each of the mixed test speech utterances, speech recognition using the grammar (104) and the mixed test speech utterance, resulting in speech recognition results for each of the mixed test speech utterances; and evaluating, for each recorded background noise, speech recognition reliability of the grammar (104) in dependence upon the speech recognition results for the mixed test speech utterance having that recorded background noise (142). Testing a grammar according to embodiments of the present invention advantageously allows a multimodal application designer to obtain recorded background noise for a particular operating environment only once and use that same recorded background noise to test any number of grammars.

Speech recognition reliability represents a measure of a speech engine's ability to use a particular grammar in accurately recognizing a speech utterance with the presence of a particular operating environment's background noise. A grammar may be adequate for use in some operating environments while being inadequate for other operating environments. For example, consider a multimodal application operating in a vehicle that provides directions to a particular city from the vehicle's current location. When the operating environment is the inside of the vehicle traveling at thirty miles per hour, the background noise may be so negligible that a speech engine can obtain accurate recognition results with a grammar that specifies all of the cities in a particular state, regardless that many cities have names that a similarly pronounced. When the operating environment changes as the vehicle speeds up to ninety miles per hour, the background noise may also have increased to the point that the speech engine cannot distinguish between the cities having similarly pronounced names. Rather a grammar that only includes the cities in a particular county may be better suited for speech recognition when the vehicle is operating at ninety miles per hour.

In the example of FIG. 1, the speech recognition reliability for various combinations of grammars and background noise is specified in a grammar reliability table (134). The multimodal devices (152) of FIG. 1 may in turn utilize the grammar reliability table (134) to enhance speech recognition performance when operating in the different environments (140). Utilizing the grammar reliability table (134) advantageously allows the multimodal applications (195) operating on the multimodal devices (152) to benefit from the grammar testing provided by the grammar analysis module (132) according to embodiments of the present invention.

The multimodal device (152) of FIG. 1 has installed upon it a multimodal application (195). The multimodal application (195) is a software component that supports user interaction in both a voice mode and visual mode, and optionally various other modes such as, for example, tactile modes. The multimodal application (195) may include computer program instructions implemented in machine code that may be scheduled for execution directly by an operating system on a processor of the multimodal device (152). For example, the multimodal application (195) may be implemented as a compiled version of program written in C++.

In other embodiments, the multimodal application (195) may include computer program instructions implemented in a higher level, non-machine language that requires runtime translation into machine code. In such embodiments, the multimodal application (195) is supported as by a multimodal execution environment (202). The multimodal execution environment (202) may support execution of the multimodal application (195) by processing the multimodal application (195) itself or coordinating with other local or remote components such as, for example, a voice interpreter (192) to process portions of the multimodal application (195). The multimodal execution environment (202) may translate the multimodal application (195) into platform specific, machine code directly executable on the processors of the multimodal device (152), perform memory management for the multimodal application (195) during execution, control access to platform hardware, and so on. The implementation of the multimodal execution environment (202) typically depends on the implementation of the multimodal application (195). When the multimodal application (195) is implemented using X+V or SALT tags, then the multimodal execution environment may be implemented as a multimodal browser. When the multimodal application (195) is implemented using Java, then the multimodal execution environment may be implemented as a Java Virtual Machine. Readers will note that the implementations described above are for explanation only and not for limitation.

The multimodal device (152) of FIG. 1 supports multiple modes of user interaction with the multimodal application (195) including a voice mode and a visual mode, and optionally one or more other modes of user interaction with the multimodal application (195). The voice mode is represented here with audio output of voice prompts and responses (314) from the multimodal devices (152) and audio input of speech for recognition (315) from a user (128). Non-voice modes are represented by input/output devices such as keyboards and display screens on the multimodal devices (152). The voice mode of user interaction with the multimodal application is supported by a voice interpreter (192), through which the multimodal application (195) is operatively coupled to a speech engine (153). The operative coupling may be implemented with an application programming interface ('API'), a voice service module, or a VoIP connection as explained in more detail below.

In the exemplary system of FIG. 1, the voice interpreter (192) supports the voice mode of user interaction with the multimodal application (195) by providing grammars, speech for recognition, and text prompts for speech synthesis to the speech engine (153), and by returning to the multimodal application (195) speech engine output in the form of recognized speech, semantic interpretation results, and digitized speech for voice prompts. The implementation of the voice interpreter (192) typically depends on the technology implementing the multimodal application (195). The voice interpreter (192) of FIG. 1 may be implemented as a VoiceXML interpreter when the multimodal application (195) implements X+V. A VoiceXML interpreter is a software module of computer program instructions that accepts voice dialog instructions from a multimodal application, typically in the form of a VoiceXML <form> element. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA'). When the multimodal application (195) is implemented according to SALT, the voice interpreter (192) may be implemented as a SALT interpreter. When the multimodal application (195) is implemented using Java, the voice interpreter (192) may be implemented using a VoiceXML interpreter that exposes a Java interface.

Each multimodal device (152) of FIG. 1 is an automated device, that is, automated computing machinery or a computer program running on an automated device, that is capable of accepting from users more than one mode of input, keyboard, mouse, stylus, and so on, including speech input— and also rendering more than one mode of output, graphic, speech, and so on. A multimodal device is generally capable of accepting speech input from a user, digitizing the speech, and providing digitized speech to a speech engine for recognition. A multimodal device may be implemented, for example, as a voice-enabled browser on a laptop, a voice-enabled browser on a smart phone handset, an online game implemented with Java on a personal computer, and with other combinations of hardware and software as may occur to those of skill in the art. Because multimodal applications may be implemented in markup languages (X+V, SALT), object-oriented languages (Java, C++), procedural languages (the C programming language), and in other kinds of computer languages as may occur to those of skill in the art, this specification uses the term 'multimodal application' to refer to any software application, server-oriented or client-oriented, thin client or thick client, that administers more than one mode of input and more than one mode of output, typically including visual and speech modes.

The system of FIG. 1 includes several example multimodal devices:
  personal digital assistant ('PDA') (112) which is coupled for data communications to data communications network (100) through wireless connection (114),
  smart phone (110) which is coupled for data communications to data communications network (100) through wireless connection (116), and
  laptop computer (126) which is coupled for data communications to data communications network (100) through wireless connection (118).

Each of the example multimodal devices (152) in the system of FIG. 1 includes a microphone, an audio amplifier, a digital-to-analog converter, and a multimodal application capable of accepting from a user (128) speech for recognition (315), digitizing the speech, and providing the digitized speech to a speech engine for recognition. The speech may be digitized according to industry standard codecs, including but not limited to those used for Distributed Speech Recognition as such. Methods for 'COding/DECoding' speech are referred to as 'codecs.' The European Telecommunications Standards Institute ('ETSI') provides several codecs for encoding speech for use in DSR, including, for example, the ETSI ES 201 108 DSR Front-end Codec, the ETSI ES 202 050 Advanced DSR Front-end Codec, the ETSI ES 202 211 Extended DSR Front-end Codec, and the ETSI ES 202 212 Extended Advanced DSR Front-end Codec. In standards such as RFC3557 entitled
  RTP Payload Format for European Telecommunications Standards Institute (ETSI) European Standard ES 201 108 Distributed Speech Recognition Encoding
and the Internet Draft entitled
  RTP Payload Formats for European Telecommunications Standards Institute (ETSI) European Standard ES 202 050, ES 202 211, and ES 202 212 Distributed Speech Recognition Encoding,
the IETF provides standard RTP payload formats for various codecs. It is useful to note, therefore, that there is no limitation in the present invention regarding codecs, payload formats, or packet structures. Speech for testing a grammar used in speech recognition for reliability in a plurality of operating environments having different background noise according to embodiments of the present invention may be encoded with any codec, including, for example:
  AMR (Adaptive Multi-Rate Speech coder)
  ARDOR (Adaptive Rate-Distortion Optimized sound codeR),
  Dolby Digital (A/52, AC3),
  DTS (DTS Coherent Acoustics),
  MP1 (MPEG audio layer-1),
  MP2 (MPEG audio layer-2) Layer 2 audio codec (MPEG-1, MPEG-2 and non-ISO MPEG-2.5),
  MP3 (MPEG audio layer-3) Layer 3 audio codec (MPEG-1, MPEG-2 and non-ISO MPEG-2.5),
  Perceptual Audio Coding,
  FS-1015 (LPC-10),
  FS-1016 (CELP),
  G.726 (ADPCM),
  G.728 (LD-CELP),
  G.729 (CS-ACELP),
  GSM,
  HILN (MPEG-4 Parametric audio coding), and
  others as may occur to those of skill in the art.

As mentioned, a multimodal device according to embodiments of the present invention is capable of providing speech for recognition to a speech engine (153). A speech engine is a functional module, typically a software module, although it may include specialized hardware also, that does the work of recognizing and generating or 'synthesizing' human speech. The speech engine implements speech recognition by use of a further module referred to in this specification as an automated speech recognition ('ASR') engine, and the speech engine carries out speech synthesis by use of a further module referred to in this specification as a text-to-speech ('TTS') engine. As shown in FIG. 1, a speech engine (153) may be installed locally in the multimodal device (152) itself, or a speech engine (153) may be installed remotely with respect to the multimodal device, across a data communications network (100) in a voice server (151). A multimodal device that itself contains its own speech engine is said to implement a 'thick client' or 'thick client,' because the thick client itself contains all the functionality needed to carry out speech recognition and speech synthesis—through API calls to speech recognition and speech synthesis modules in the multimodal device itself with no need to send requests for speech recognition across a network and no need to receive synthesized speech across a network from a remote voice server. A multimodal device that does not contain its own speech engine is said to implement a 'thin client' because the thin client itself contains only a relatively thin layer of application software that obtains speech recognition and speech synthesis services from a voice server located remotely across a network from the thin client. For ease of explanation, only one (112) of the multimodal devices (152) in the system of FIG. 1 is shown with a speech engine (153), but readers will recognize that any multimodal device may have a speech engine according to embodiments of the present invention.

As shown in FIG. 1, a speech engine (153) and a voice interpreter (192) may be installed locally in the multimodal device (112) itself, or a speech engine (153) and a voice interpreter (192) may be installed remotely with respect to the multimodal device, across a data communications network (100) in a voice server (151). In a thick client architecture, a multimodal device (152) includes both its own speech engine (153) and its own voice interpreter (192). The voice interpreter (192) exposes an API to the multimodal application (195) for use in providing speech recognition and speech synthesis for the multimodal application. The multimodal application provides, for example, dialog instructions, VoiceXML <form> elements, grammars, input elements, event handlers, and so on, through the API to the voice interpreter (192), and the voice interpreter (192) administers the speech engine on behalf of the multimodal application. In the thick client architecture, a multimodal application, including for example, VoiceXML dialogs, is interpreted by a voice interpreter on the multimodal device. In the thin client architecture, a multimodal application, including for example VoiceXML dialogs, is interpreted by a voice interpreter on a voice server (151) located remotely across a data communications network (100) from the multimodal device running the multimodal application (195).

In a thin client architecture, the speech engine (153) and the voice interpreter (192) are located remotely from the multimodal client device in a voice server (151), the API for the voice interpreter is still implemented in the multimodal device, with the API modified to communicate voice dialog instructions, speech for recognition, and text and voice prompts to and from the voice interpreter on the voice server. For ease of explanation, only one (112) of the multimodal devices (152) in the system of FIG. 1 is shown with a voice interpreter (192), but readers will recognize that any multimodal device may have a voice interpreter according to embodiments of the present invention.

The use of these three example multimodal devices (152) is for explanation only, not for limitation of the invention. Any automated computing machinery capable of accepting speech from a user, providing the speech digitized to a speech engine through a voice interpreter, and receiving and playing speech prompts and responses from the voice interpreter may be improved to function as a multimodal device for adjusting a speech engine based on background noise according to embodiments of the present invention.

The system of FIG. 1 also includes a voice server (151) which is connected to data communications network (100) through wireline connection (122). The voice server (151) is a computer that runs a speech engine (153). The voice server (151) provides voice recognition services for multimodal devices by accepting requests for speech recognition and returning text representing recognized speech. Voice server (151) also provides speech synthesis, text to speech ('TTS') conversion, for voice prompts and voice responses (314) to user input in multimodal applications such as, for example, X+V applications, SALT applications, or Java voice applications.

The system of FIG. 1 includes a data communications network (100) that connects the multimodal devices (152), the voice server (151), the web server (147), and the laboratory server (136) for data communications. A data communications network for testing a grammar used in speech recognition for reliability in a plurality of operating environments having different background noise according to embodiments of the present invention is a data communications network composed of a plurality of computers that function as data communications routers connected for data communications with packet switching protocols. Such a data communications network may be implemented with optical connections, wireline connections, or with wireless connections. Such a data communications network may include intranets, internets, local area data communications networks ('LANs'), and wide area data communications networks ('WANs'). Such a data communications network may implement, for example:

a link layer with the Ethernet™ Protocol or the Wireless Ethernet™ Protocol,
a data communications network layer with the Internet Protocol ('IP'),
a transport layer with the Transmission Control Protocol ('TCP') or the User Datagram Protocol ('UDP'),
an application layer with the HyperText Transfer Protocol ('HTTP'), the Session Initiation Protocol ('SIP'), the Real Time Protocol ('RTP'), the Distributed Multimodal Synchronization Protocol ('DMSP'), the Wireless Access Protocol ('WAP'), the Handheld Device Transfer Protocol ('HDTP'), the ITU protocol known as H.323, and
other protocols as will occur to those of skill in the art.

The system of FIG. 1 includes a web server (147) connected for data communications through wireline connection (123) to network (100) and therefore to the multimodal devices (152). The web server (147) may be any server that provides to client devices markup documents that compose multimodal applications. The web server (147) typically provides such markup documents via a data communications protocol, HTTP, HDTP, WAP, or the like. That is, although the term 'web' is used to described the web server generally in this specification, there is no limitation of data communications between multimodal devices and the web server to HTTP alone. The markup documents also may be implemented in any markup language that supports non-speech display elements, data entry elements, and speech elements for identifying which speech to recognize and which words to speak, grammars, form elements, and the like, including, for example, X+V and SALT. A multimodal application in a multimodal device then, upon receiving from the web sever (147) a markup document as part of a multimodal application, may execute speech elements by use of a voice interpreter (192) and speech engine (153) in the multimodal device itself or by use of a voice interpreter (192) and speech engine (153) located remotely from the multimodal device in a voice server (151).

The arrangement of the multimodal devices (152), the web server (147), the voice server (151), laboratory server (136), and the data communications network (100) making up the exemplary system illustrated in FIG. 1 are for explanation, not for limitation. Data processing systems useful for testing a grammar used in speech recognition for reliability in a plurality of operating environments having different background noise according to various embodiments of the present invention may include additional servers, routers, other devices, and peer-to-peer architectures, not shown in FIG. 1, as will occur to those of skill in the art. Data communications networks in such data processing systems may support many data communications protocols in addition to those noted above. Various embodiments of the present invention may be implemented on a variety of hardware platforms in addition to those illustrated in FIG. 1.

Testing a grammar used in speech recognition for reliability in a plurality of operating environments having different background noise according to embodiments of the present invention may be implemented with one or more computers, that is, automated computing machinery. For further explanation, therefore, FIG. 2 sets forth a block diagram of automated computing machinery comprising an example of a computer useful as a laboratory server in testing a grammar used in speech recognition for reliability in a plurality of operating environments having different background noise according to embodiments of the present invention. The laboratory server (136) of FIG. 2 includes at least one computer processor (156) or 'CPU' as well as random access memory (168) ('RAM') which is connected through a high speed memory bus (166) and bus adapter (158) to processor (156) and to other components of the laboratory server.

Figure 2:
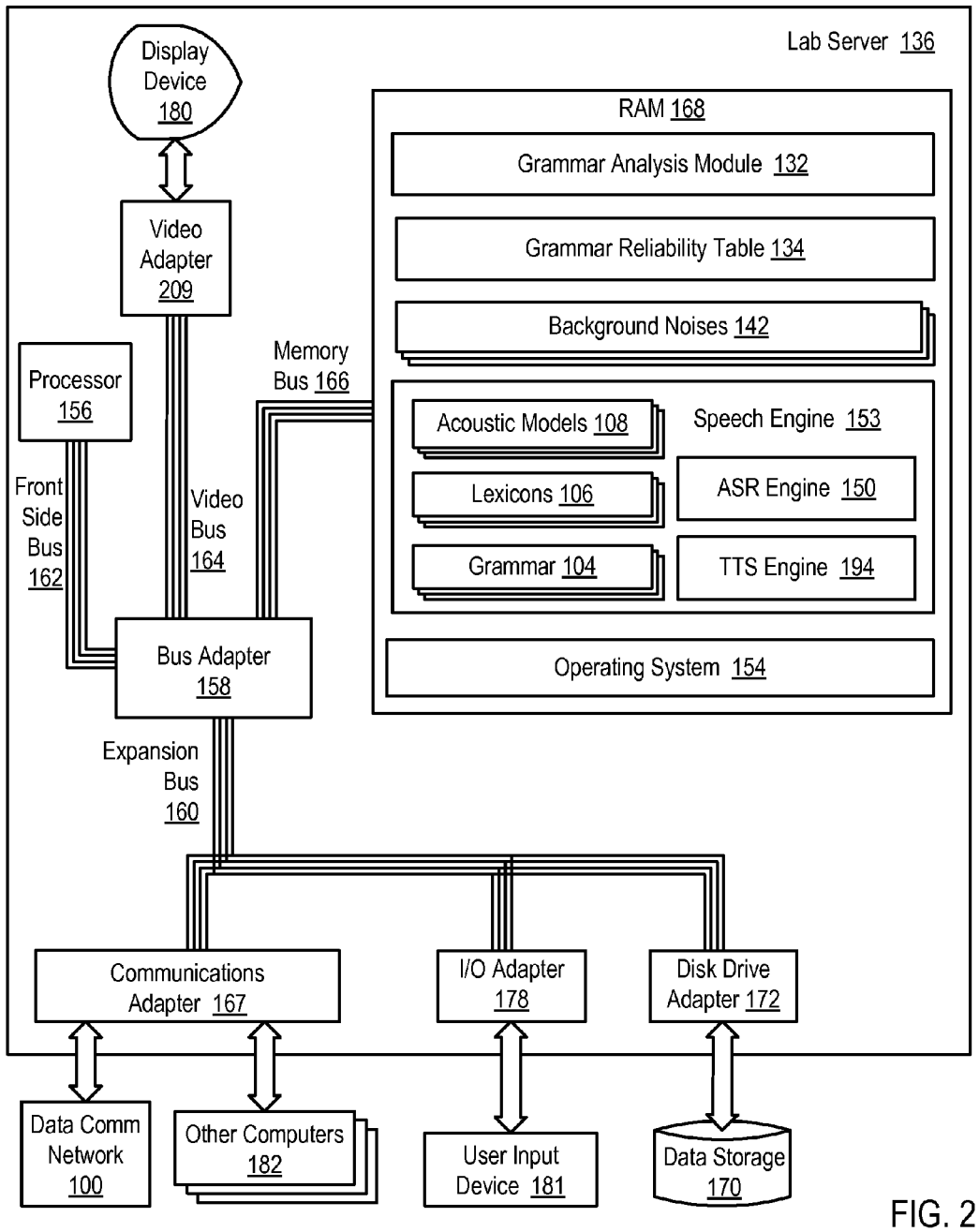
FIG. 2 sets forth a block diagram of automated computing machinery comprising an example of a computer useful as a laboratory server in testing a grammar used in speech recognition for reliability in a plurality of operating environments having different background noise according to embodiments of the present invention.

Stored in RAM (168) is a grammar analysis module (132), a set of computer program instructions capable of testing a grammar used in speech recognition for reliability in a plurality of operating environments having different background noise according to embodiments of the present invention. The grammar analysis module (132) of FIG. 2 operates generally for testing a grammar used in speech recognition for reliability in a plurality of operating environments having different background noise according to embodiments of the present invention by: receiving recorded background noise (142) for each of the plurality of operating environments; generating a test speech utterance for recognition by the speech recognition engine (153) using the grammar (104); mixing the test speech utterance with each recorded background noise (142), resulting in a plurality of mixed test speech utterances, each mixed test speech utterance having different background noise (142); performing, for each of the mixed test speech utterances, speech recognition using the grammar (104) and the mixed test speech utterance, resulting in speech recognition results for each of the mixed test speech utterances; and evaluating, for each recorded background noise, speech recognition reliability of the grammar (104) in dependence upon the speech recognition results for the mixed test speech utterance having that recorded background noise (142). In the example of FIG. 2, the speech recognition reliability for various combinations of grammars and background noise is specified in a grammar reliability table (134).

The speech engine (153) of FIG. 2 is a functional module, typically a software module, although it may include specialized hardware also, that does the work of recognizing and generating human speech. The speech engine (153) includes an ASR engine (150) for speech recognition and a text-to-speech ('TTS') engine (194) for generating speech. The speech engine also includes grammars (104), lexicons (106), and language-specific acoustic models (108). Each lexicon (106) and language-specific acoustic model (108) may be associated with a separate language in a configuration parameter repository (200).

The acoustic models (108) associate speech waveform data representing recorded pronunciations of speech with textual representations of those pronunciations, which are referred to as 'phonemes.' The speech waveform data may be implemented as a Speech Feature Vector ('SFV') that may be represented, for example, by the first twelve or thirteen Fourier or frequency domain components of a sample of digitized speech waveform. Accordingly, the acoustic models (108) may be implemented as data structures or tables in a database, for example, that associates these SFVs with phonemes representing, to the extent that it is practically feasible to do so, all pronunciations of all the words in various human languages, each language having a separate acoustic model (108). The lexicons (106) are associations of words in text form with phonemes representing pronunciations of each word; the lexicon effectively identifies words that are capable of recognition by an ASR engine. Each language has a separate lexicon (106). Also stored in RAM (168) is a Text To Speech ('TTS') Engine (194), a module of computer program instructions that accepts text as input and returns the same text in the form of digitally encoded speech, for use in providing speech as prompts for and responses to users of multimodal systems.

The grammars (104) communicate to the ASR engine (150) the words and sequences of words that currently may be recognized. For precise understanding, readers will distinguish the purpose of the grammar and the purpose of the lexicon. The lexicon associates with phonemes all the words that the ASR engine can recognize. The grammar communicates the words currently eligible for recognition. The set of words currently eligible for recognition and the set of words capable of recognition may or may not be the same.

Also stored in RAM (168) is an operating system (154). Operating systems useful in voice servers according to embodiments of the present invention include UNIX™, Linux™, Microsoft Vista™, IBM's AIX™, IBM's i5/OS™, and others as will occur to those of skill in the art. Operating system (154), speech engine (153), grammar analysis module (132), grammar reliability table (134), and background noises (142) in the example of FIG. 2 are shown in RAM (168), but many components of such software typically are stored in non-volatile memory also, for example, on a disk drive (170).

Laboratory server (136) of FIG. 2 includes bus adapter (158), a computer hardware component that contains drive electronics for high speed buses, the front side bus (162), the video bus (164), and the memory bus (166), as well as drive electronics for the slower expansion bus (160). Examples of bus adapters useful in laboratory servers according to embodiments of the present invention include the Intel Northbridge, the Intel Memory Controller Hub, the Intel Southbridge, and the Intel I/O Controller Hub. Examples of expansion buses useful in laboratory servers according to embodiments of the present invention include Peripheral Component Interconnect ('PCI') and PCI-Extended ('PCI-X') bus, as well as PCI Express ('PCIe') point to point expansion architectures and others.

Laboratory server (136) of FIG. 2 includes disk drive adapter (172) coupled through expansion bus (160) and bus adapter (158) to processor (156) and other components of the laboratory server (136). Disk drive adapter (172) connects non-volatile data storage to the laboratory server (136) in the form of disk drive (170). Disk drive adapters useful in laboratory servers include Integrated Drive Electronics ('IDE') adapters, Small Computer System Interface ('SCSI') adapters, and others as will occur to those of skill in the art. In addition, non-volatile computer memory may be implemented for a laboratory server as an optical disk drive, electrically erasable programmable read-only memory (so-called 'EEPROM' or 'Flash' memory), RAM drives, and so on, as will occur to those of skill in the art.

The example laboratory server of FIG. 2 includes one or more input/output ('I/O') adapters (178). I/O adapters in laboratory servers implement user-oriented input/output through, for example, software drivers and computer hardware for controlling output to display devices such as computer display screens, as well as user input from user input devices (181) such as keyboards and mice. The example laboratory server of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary laboratory server (136) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for testing a grammar used in speech recognition for reliability in a plurality of operating environments having different background noise according to embodiments of the present invention include modems for wired dial-up communications, Ethernet (IEEE 802.3) adapters for wired data communications network communications, and 802.11 adapters for wireless data communications network communications.

As mentioned above, the grammars tested by a grammar analysis module may be utilized to perform speech recognition for a multimodal application operating on a multimodal device. In a thin client architecture, a voice server may provide speech recognition services using the grammars tested according to embodiments of the present application and provided to the voice server by a multimodal application in the form, for example, of VoiceXML dialogs. For further explanation, therefore, FIG. 3 sets forth a block diagram of automated computing machinery comprising an example of a computer useful as a voice server (151) in testing a grammar used in speech recognition for reliability in a plurality of operating environments having different background noise according to embodiments of the present invention.

Figure 3:
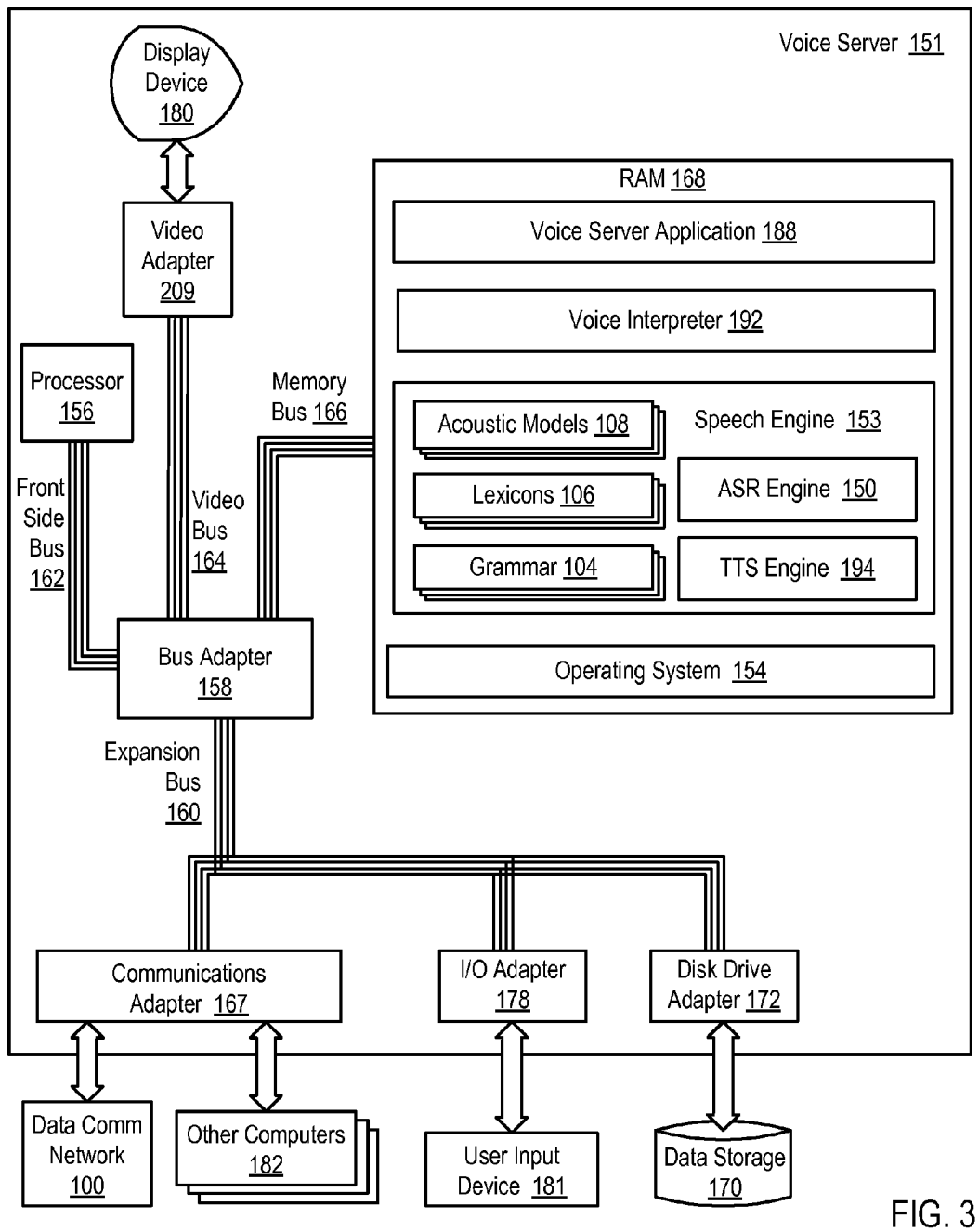
FIG. 3 sets forth a block diagram of automated computing machinery comprising an example of a computer useful as a voice server in testing a grammar used in speech recognition for reliability in a plurality of operating environments having different background noise according to embodiments of the present invention.

The example voice server (151) of FIG. 3 includes several components that are structured and operate similarly to the components of the laboratory server, having the same drawing reference numbers, as described above with reference to FIG. 2: at least one computer processor (156), front side bus (162), RAM (168), high speed memory bus (166), bus adapter (158), video adapter (209), video bus (164), expansion bus (160), communications adapter (167), I/O adapter (178), disk drive adapter (172), an operating system (154), a speech engine (153), and so on. As in the system of FIG. 2, the speech engine (153) in the voice server (151) of FIG. 3 includes an ASR engine (150), grammars (104), lexicons (106), acoustic models (108), and a TTS engine (194).

Stored in RAM (168) is a voice server application (188), a module of computer program instructions capable of operating a voice server according to embodiments of the present invention. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in multimodal applications such as, for example, X+V applications, SALT applications, or Java Speech applications.

Voice server application (188) may be implemented as a web server, implemented in Java, C++, or another language, that supports X+V, SALT, VoiceXML, or other multimodal languages, by providing responses to HTTP requests from X+V clients, SALT clients, Java Speech clients, or other multimodal clients. Voice server application (188) may, for a further example, be implemented as a Java server that runs on a Java Virtual Machine and supports a Java voice framework by providing responses to HTTP requests from Java client applications running on multimodal devices. And voice server applications that support embodiments of the present invention may be implemented in other ways as may occur to those of skill in the art, and all such ways are well within the scope of the present invention.

Also stored in RAM is a voice interpreter (192), a module of computer program instructions that supports the voice mode of user interaction with a multimodal application operating on a multimodal device. The voice interpreter (192) provides speech engine input such as grammars, speech for recognition, and text prompts for speech synthesis to the speech engine (153) and returns to the multimodal application speech engine output in the form of recognized speech, semantic interpretation results, and digitized speech for voice prompts. Input to voice interpreter (192) may originate, for example, from VoiceXML clients running remotely on multimodal devices, from X+V clients running remotely on multimodal devices, from SALT clients running on multimodal devices, or from Java client applications running remotely on multimodal devices. In this example, voice interpreter (192) interprets and executes VoiceXML segments representing voice dialog instructions received from remote multimodal devices and provided to voice interpreter (192) through voice server application (188).

When implemented in X+V, a multimodal application in a thin client architecture may provide voice dialog instructions, VoiceXML segments, VoiceXML <form> elements, and the like, to voice interpreter (149) through data communications across a network with the multimodal application. The voice dialog instructions include one or more grammars, data input elements, event handlers, and so on, that advise the voice interpreter how to administer voice input from a user and voice prompts and responses to be presented to a user. The voice interpreter (192) administers such dialogs by processing the dialog instructions sequentially in accordance with a VoiceXML Form Interpretation Algorithm ('FIA'). The voice interpreter (192) interprets VoiceXML dialogs provided to the voice interpreter (192) by a multimodal application.

Figure 4:
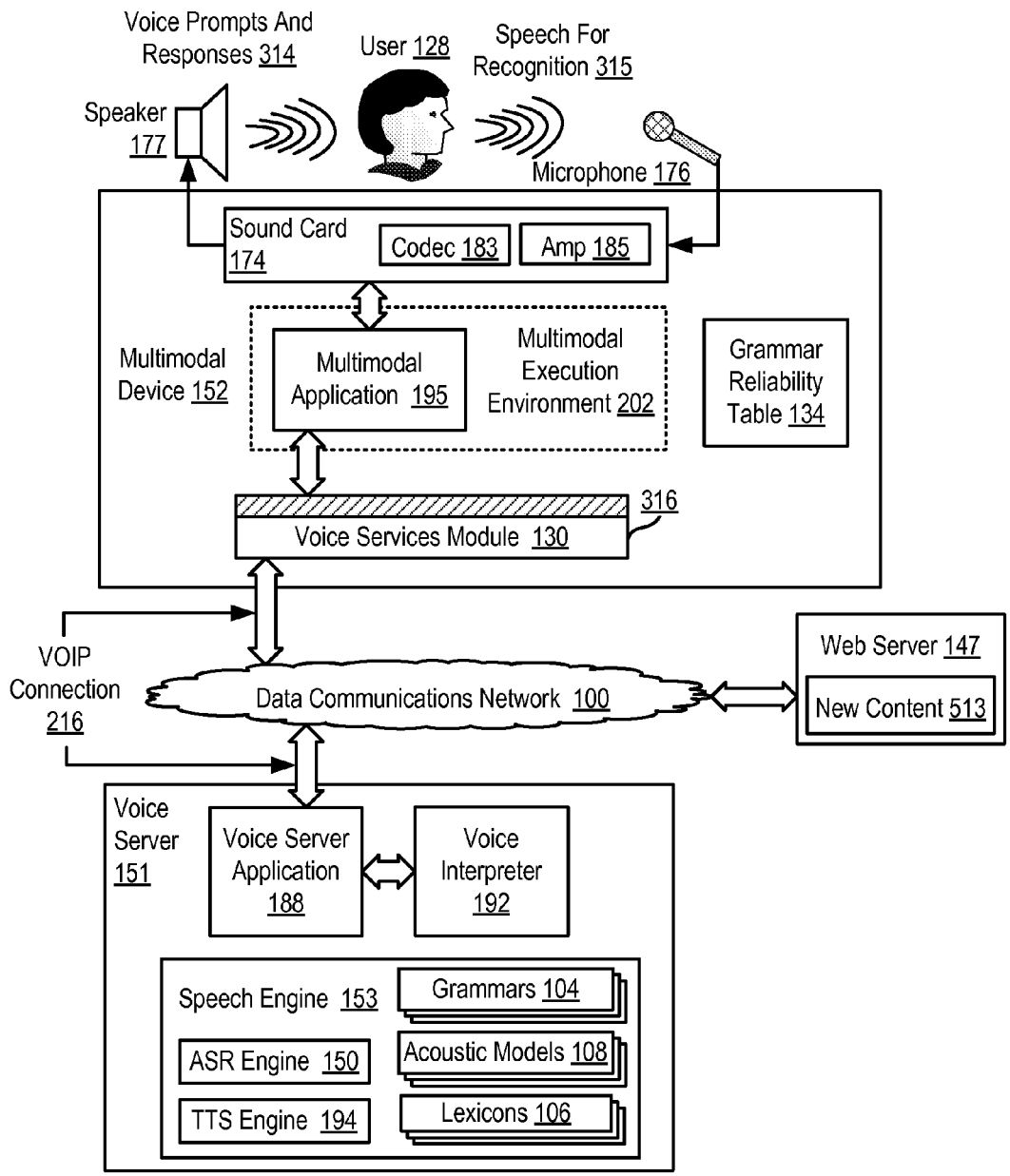
FIG. 4 sets forth a functional block diagram of exemplary apparatus in a thin client architecture useful in testing a grammar used in speech recognition for reliability in a plurality of operating environments having different background noise according to embodiments of the present invention.

For further explanation regarding the thin client architecture, FIG. 4 sets forth a functional block diagram of exemplary apparatus in a thin client architecture useful in testing a grammar used in speech recognition for reliability in a plurality of operating environments having different background noise according to embodiments of the present invention. The exemplary system of FIG. 4 includes a multimodal device (152). The example multimodal device (152) of FIG. 4 includes a sound card (174), which is an example of an I/O adapter specially designed for accepting analog audio signals from a microphone (176) and converting the audio analog signals to digital form for further processing by a codec (183).

In some embodiments, the multimodal application (195) of FIG. 4 may include computer program instructions implemented in machine code that may be scheduled for execution directly by an operating system on a processor of the multimodal device (152). For example, the multimodal application (195) may be implemented as a compiled version of program written in C++. In some other embodiments in which the multimodal application (195) is implemented in higher level, non-machine language, a multimodal execution environment (202) may support the multimodal application (195) by translating the multimodal application (195) into platform specific, machine code directly executable on the processors of the multimodal device (152), performing memory management for the multimodal application (195) during execution, controlling access to platform hardware, and so on. The implementation of the multimodal execution environment (202) typically depends on the implementation of the multimodal application (195). When the multimodal application (195) is implemented using X+V or SALT tags, then the multimodal execution environment may be implemented as a multimodal browser. When the multimodal application (195) is implemented using Java, then the multimodal execution environment may be implemented as a Java Virtual Machine.

The multimodal application (195) of FIG. 4 includes a set of computer program instructions useful according to embodiments of the present invention. In particular, the multimodal application (195) operates generally according to embodiments of the present invention by: identifying a current background noise for a current operating environment in which the multimodal device operates and altering flow of execution for the multimodal application (195) in dependence upon the identified current ground noise for the current operating environment in which the multimodal application operates. The multimodal application (195) of FIG. 4 may alter flow of execution for the multimodal application (195) by: selecting one of the plurality of grammars tested in dependence upon the current background noise and the evaluation of the speech recognition reliability of the plurality of grammars using the recorded background noises; receiving a voice utterance from a user; and performing speech recognition in dependence upon the selected grammar and the voice utterance.

In the example of FIG. 4, the multimodal application (195) selects one of the grammars tested by a laboratory server according to embodiments of the present invention using a grammar reliability table (134). The grammar reliability table (134) of FIG. 4 stores the laboratory server's evaluation of the speech recognition reliability of a plurality of grammars using recorded background noises from different operating environments. That is, using the grammar reliability table (134), the multimodal application (195) may select a grammar for the application that has a high reliability in the multimodal device's current operating environment. The multimodal application may obtain the grammar reliability table (134) by downloading the table (134) from a laboratory server through the network (100). Other ways of obtaining the grammar reliability table (134) are also well within the scope of the present application, including, for example, having the multimodal application preconfigured with the grammar reliability table (134).

The example of FIG. 4 also includes a voice server (151) having installed upon it a voice server application (188), a voice interpreter (192), and a speech engine (153). The speech engine (153) includes an ASR engine (150), grammars (104), lexicons (106), acoustic models (108), and a TTS engine (194). The grammars (104) are generally provided to the speech engine (153) by the multimodal application (195) upon requesting voice services. The voice interpreter (192) of FIG. 4 is implemented as a VoiceXML interpreter that interprets and executes VoiceXML dialog instructions received from the multimodal application and provided to voice interpreter (192) through voice server application (188). VoiceXML input to the voice interpreter (192) may originate from the multimodal application (195) implemented as an X+V client running remotely on the multimodal device (152). As noted above, the multimodal application (195) also may be implemented as a Java client application running remotely on the multimedia device (152), a SALT application running remotely on the multimedia device (152), and in other ways as may occur to those of skill in the art.

In the example of FIG. 4, the voice server (151) connects to the multimodal device (152) for data communication by a VoIP connection (216) through a data communications network (100). VoIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VoIP' protocols. VoIP traffic may be deployed on any IP data communications network, including data communications networks lacking a connection to the rest of the Internet, for instance on a private building-wide local area data communications network or 'LAN.'

Many protocols are used to effect VoIP. The two most popular types of VoIP are effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VoIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

The apparatus of FIG. 4 operate in a manner that is similar to the operation of the system of FIG. 1 described above. Multimodal application (195) is a user-level, multimodal, client-side computer program that presents a voice interface to user (128), provides audio prompts and responses (314) and accepts input speech for recognition (315). Multimodal application (195) provides a speech interface through which a user may provide oral speech for recognition through microphone (176) and have the speech digitized through an audio amplifier (185) and a coder/decoder ('codec') (183) of a sound card (174) and provide the digitized speech for recognition to ASR engine (150). Multimodal application (195) then packages the digitized speech in a recognition request message according to a VoIP protocol, and transmits the speech to voice server (151) through the VoIP connection (216) on the network (100).

Voice server application (188) provides voice recognition services for multimodal devices by accepting dialog instructions, VoiceXML segments, and returning speech recognition results, including text representing recognized speech, text for use as variable values in dialogs, and output from execution of semantic interpretation scripts as well as voice prompts. Voice server application (188) supports text-to-speech ('TTS') conversion for voice prompts and voice responses to user input in multimodal applications such as, for example, X+V applications, SALT applications, or Java Speech applications.

The voice server application (188) receives speech for recognition from a user and passes the speech through API calls to voice interpreter (192) which in turn uses an ASR engine (150) for speech recognition. The ASR engine receives digitized speech for recognition, uses frequency components of the digitized speech to derive an SFV, uses the SFV to infer phonemes for the word from the language-specific acoustic model (108), and uses the phonemes to find the speech in the lexicon (106). The ASR engine then compares speech found as words in the lexicon to words in a grammar (104) to determine whether words or phrases in speech are recognized by the ASR engine.

The multimodal application (195) is operatively coupled to the speech engine (153). In this example, the operative coupling between the multimodal application (195) and the speech engine (153) is implemented with a VoIP connection (216) through a voice services module (130), then through the voice server application (188) and the voice interpreter (192). Depending on whether the multimodal application is implemented in X+V, Java, or SALT, the voice interpreter (192) may be implemented using a VoiceXML interpreter, a VoiceXML interpreter exposing a Java interface, a SALT interpreter, or any other implementation as will occur to those of skill in the art. The voice services module (130) is a thin layer of functionality, a module of computer program instructions, that presents an API (316) for use by an application level program in providing dialog instructions and speech for recognition to a voice server application (188) and receiving in response voice prompts and other responses. In this example, application level programs are represented by multimodal application (195) and the multimodal execution environment (202).

The voice services module (130) provides data communications services through the VoIP connection and the voice server application (188) between the multimodal device (152) and the voice interpreter (192). The API (316) of FIG. 4 may be the same API presented to applications by a voice interpreter when the voice interpreter is installed on the multimodal device in a thick client architecture. So from the point of view of an application calling the API (316), the application is calling the VoiceXML interpreter directly. The data communications functions of the voice services module (130) are transparent to applications that call the API (316). At the application level, calls to the API (316) may be issued from the multimodal browser (196), which provides an execution environment for the multimodal application (195) when the multimodal application is implemented with X+V. And calls to the API (316) may be issued from the JVM (101), which provides an execution environment for the multimodal application (195) when the multimodal application is implemented with Java.

Figure 5:
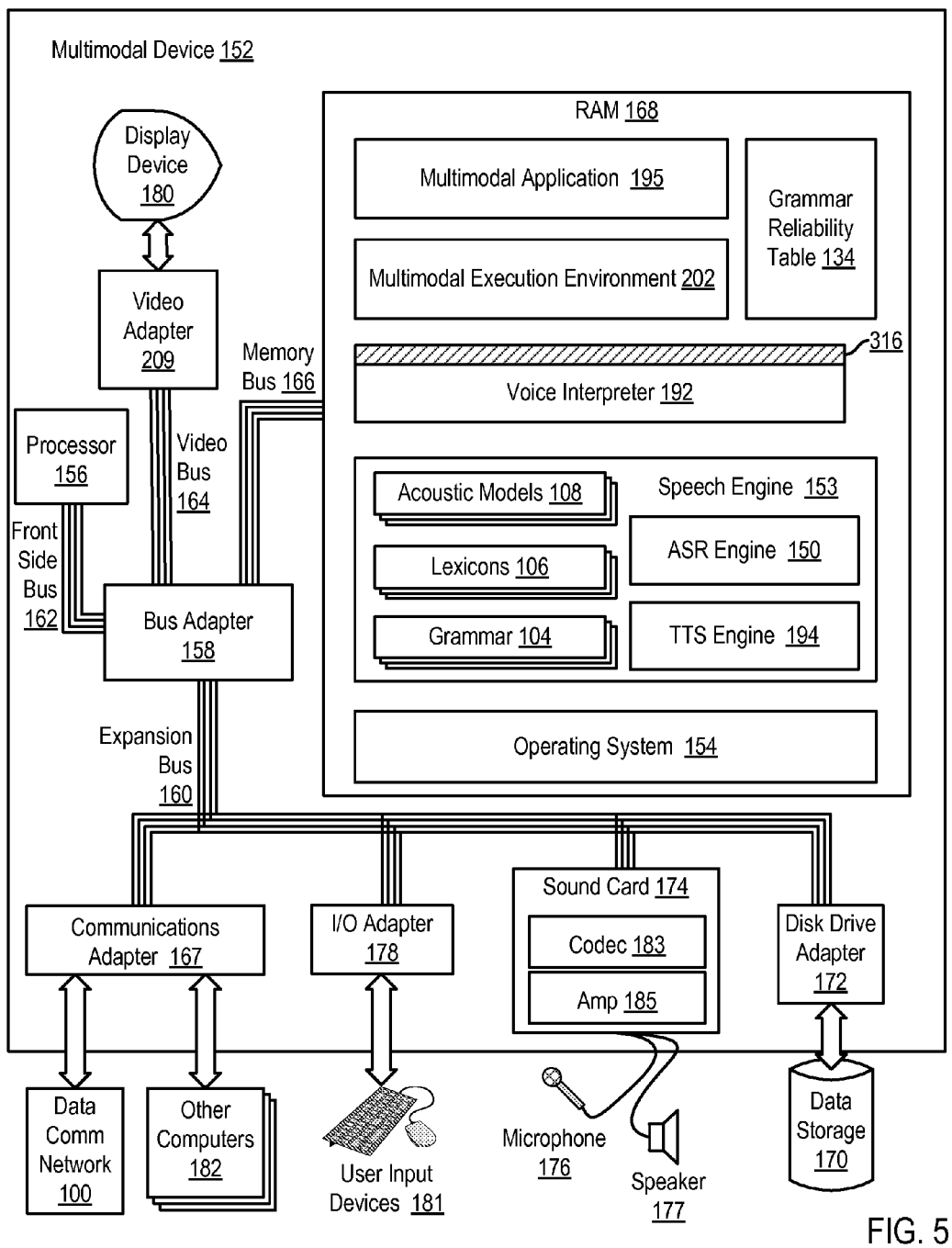
FIG. 5 sets forth a block diagram of automated computing machinery comprising an example of a computer useful as a multimodal device in a thick client architecture useful in testing a grammar used in speech recognition for reliability in a plurality of operating environments having different background noise according to embodiments of the present invention.

The explanation above with reference to FIGS. 3 and 4 describe a voice server that provide speech services to a multimodal device in a thin client architecture. As mentioned above, the grammars tested by a grammar analysis module according to embodiments of the present invention may be utilized to perform speech recognition for a multimodal application operating on a multimodal device in a thick client architecture. For further explanation, therefore, FIG. 5 sets forth a block diagram of automated computing machinery comprising an example of a computer useful as a multimodal device in a thick client architecture useful in testing a grammar used in speech recognition for reliability in a plurality of operating environments having different background noise according to embodiments of the present invention. In a multimodal device implementing a thick client architecture as illustrated in FIG. 5, the multimodal device (152) has no connection to a remote voice server containing a voice interpreter and a speech engine. All the components needed for speech synthesis and voice recognition using grammars tested for reliability in a plurality of operating environments having different background noise according to embodiments of the present invention are installed or embedded in the multimodal device itself.

The example multimodal device (152) of FIG. 5 includes several components that are structured and operate similarly to the components of the voice server, having the same drawing reference numbers, as described above with reference to FIGS. 2 and 3: at least one computer processor (156), frontside bus (162), RAM (168), high speed memory bus (166), bus adapter (158), video adapter (209), video bus (164), expansion bus (160), communications adapter (167), I/O adapter (178), disk drive adapter (172), an operating system (154), a voice interpreter (192), a speech engine (153), and so on. As in the system of FIG. 3, the speech engine (153) in the multimodal device of FIG. 5 includes an ASR engine (150), grammars (104), lexicons (106), acoustic models (108), and a TTS engine (194). The voice interpreter (192) may be implemented as a VoiceXML interpreter that administers dialogs by processing the dialog instructions sequentially in accordance with a VoiceXML Form Interpretation Algorithm ('FIA').

The speech engine (153) in this kind of embodiment, a thick client architecture, often is implemented as an embedded module in a small form factor device such as a handheld device, a mobile phone, PDA, and the like. An example of an embedded speech engine that may be improved utilizing grammars tested for reliability in a plurality of operating environments having different background noise according to embodiments of the present invention is IBM's Embedded ViaVoice Enterprise. The example multimodal device of FIG. 5 also includes a sound card (174), which is an example of an I/O adapter specially designed for accepting analog audio signals from a microphone (176) and converting the audio analog signals to digital form for further processing by a codec (183). The sound card (174) is connected to processor (156) through expansion bus (160), bus adapter (158), and front side bus (162).

Also stored in RAM (168) in this example is a multimodal application (195), a module of computer program instructions capable of operating a multimodal device as an apparatus that supports multiple modes of user interaction, including a voice mode and one or more non-voice modes. The multimodal application (195) implements speech recognition by accepting speech for recognition from a user and sending the speech for recognition through API calls to the ASR engine (150). The multimodal application (195) implements speech synthesis generally by sending words to be used as prompts for a user to the TTS engine (194). As an example of thick client architecture, the multimodal application (195) in this example does not send speech for recognition across a network to a voice server for recognition, and the multimodal application (195) in this example does not receive synthesized speech, TTS prompts and responses, across a network from a voice server. All grammar processing, voice recognition, and text to speech conversion in this example is performed in an embedded fashion in the multimodal device (152) itself.

More particularly, multimodal application (195) in this example is a user-level, multimodal, client-side computer program that provides a speech interface through which a user may provide oral speech for recognition through microphone (176), have the speech digitized through an audio amplifier (185) and a coder/decoder ('codec') (183) of a sound card (174) and provide the digitized speech for recognition to ASR engine (150). The multimodal application (195) may be implemented as a set or sequence of X+V documents executing in a multimodal execution environment (202) implemented as a multimodal browser or microbrowser that passes VoiceXML grammars and digitized speech by calls through an API (316) directly to an embedded voice interpreter (192) for processing. The embedded voice interpreter (192) may in turn issue requests for speech recognition through API calls directly to the embedded ASR engine (150). Multimodal application (195) also can provide speech synthesis, TTS conversion, by API calls to the embedded TTS engine (194) for voice prompts and voice responses to user input.

In a further class of exemplary embodiments, the multimodal application (195) may be implemented as a Java voice application that executes in a multimodal execution environment (202) implemented as a Java Virtual Machine and issues calls through an API of the voice interpreter (192) for speech recognition and speech synthesis services. In further exemplary embodiments, the multimodal application (195) may be implemented as a set or sequence of SALT documents executed in a multimodal execution environment (202) implemented as a multimodal browser or microbrowser that issues calls through an API of the voice interpreter (192) for speech recognition and speech synthesis services. In addition to X+V, SALT, and Java implementations, multimodal application (195) may be implemented in other technologies as will occur to those of skill in the art, and all such implementations are well within the scope of the present invention.

The multimodal application (195) of FIG. 5 includes a set of computer program instructions for operating according to embodiments of the present invention. The multimodal application (195) may operate generally according to embodiments of the present invention by: identifying a current background noise for a current operating environment in which the multimodal device operates and altering flow of execution for the multimodal application (195) in dependence upon the identified current ground noise for the current operating environment in which the multimodal application operates. The multimodal application (195) of FIG. 5 may alter flow of execution for the multimodal application (195) by: selecting one of the plurality of grammars tested in dependence upon the current background noise and the evaluation of the speech recognition reliability of the plurality of grammars using the recorded background noises; receiving a voice utterance from a user; and performing speech recognition in dependence upon the selected grammar and the voice utterance. In the example of FIG. 5, the multimodal application (195) selects one of the grammars tested by a laboratory server according to embodiments of the present invention using a grammar reliability table (134). The grammar reliability table (134) of FIG. 5 stores the laboratory server's evaluation of the speech recognition reliability for a plurality of grammars using recorded background noises from different operating environments.

The multimodal application (195) may also operate generally according to embodiments of the present invention by altering flow of execution for the multimodal application in dependence upon the identified current ground noise for the current operating environment in which the multimodal application operates. In such a manner, the multimodal application (195) may utilize different dialogs to interact with the user depending on the multimodal device's current operating environment.

The multimodal application (195) of FIG. 5 is operatively coupled to the speech engine (153). In this example, the operative coupling between the multimodal application and the speech engine (153) is implemented through the voice interpreter (192). Depending on whether the multimodal application is implemented in X+V, Java, or SALT, the voice interpreter (192) may be implemented as a VoiceXML interpreter, a VoiceXML interpreter exposing a Java interface, or SALT interpreter. When the multimodal application (195) is implemented in X+V, the operative coupling is effected through the multimodal execution environment (202), which provides an operating environment and an interpreter for the X+V application, and then through a VoiceXML interpreter, which passes grammars and voice utterances for recognition to the speech engine (153) through the voice interpreter (192). When the multimodal application (195) is implemented in Java Speech, the multimodal execution environment (202) is implemented as a Java Virtual Machine, which provides an operating environment for the Java application and the voice interpreter (192), which passes grammars and voice utterances for recognition to the speech engine (153). When the multimodal application (195) is implemented in SALT, the multimodal execution environment (202) is implemented as a multimodal browser, which provides an operating environment and an interpreter for the X+V application, and then through a SALT interpreter, which passes grammars and voice utterances for recognition to the speech engine (153).

The multimodal application (195) in this example, running on a multimodal device (152) that contains its own voice interpreter (192) and its own speech engine (153) with no network or VoIP connection to a remote voice server containing a remote VoiceXML interpreter or a remote speech engine, is an example of a so-called 'thick client architecture,' so-called because all of the functionality for processing voice mode interactions between a user and the multimodal application is implemented on the multimodal device itself.

Figure 6:
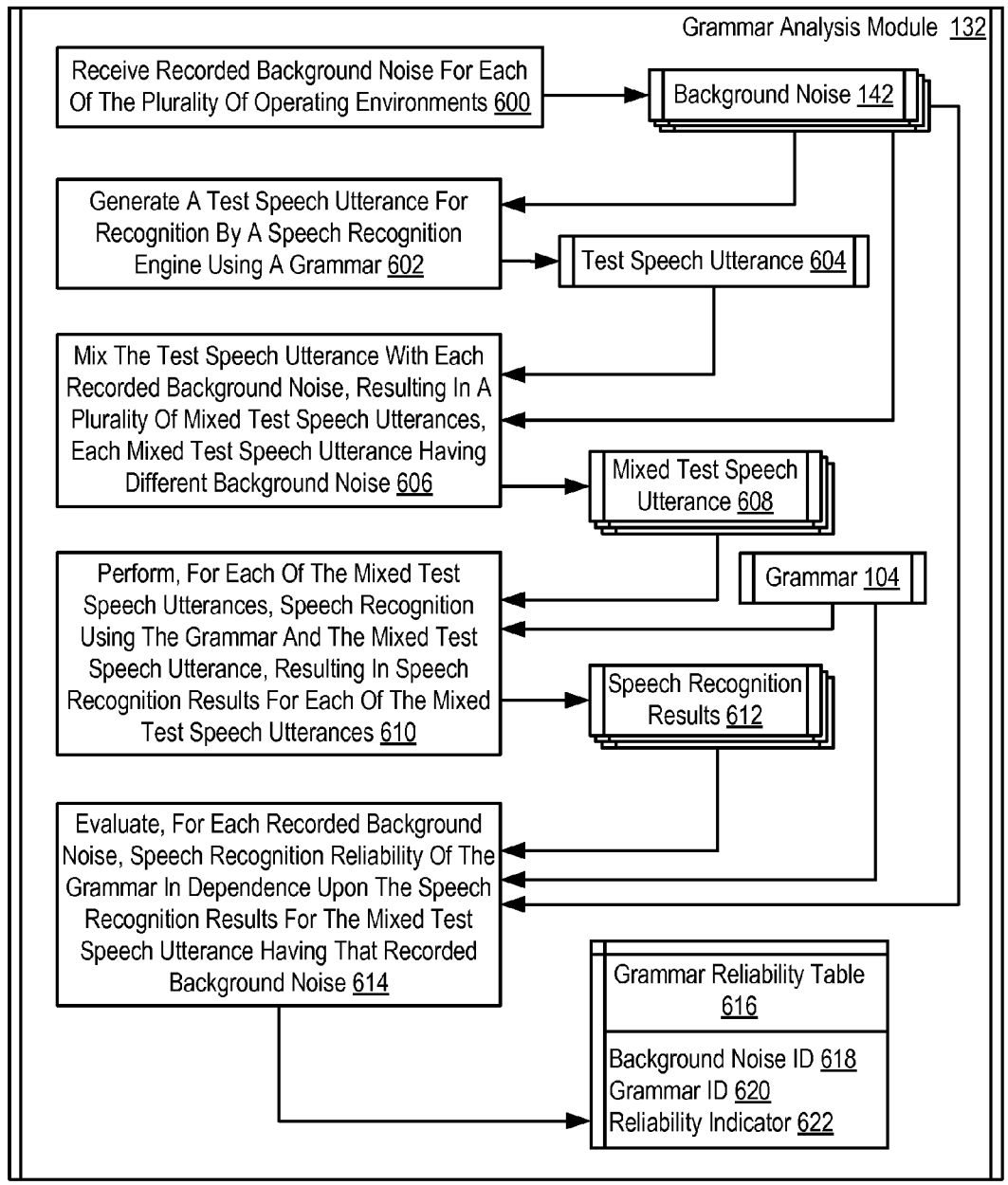
FIG. 6 sets forth a flow chart illustrating an exemplary method of testing a grammar used in speech recognition for reliability in a plurality of operating environments having different background noise according to embodiments of the present invention.

For further explanation, FIG. 6 sets forth a flow chart illustrating an exemplary method of testing a grammar used in speech recognition for reliability in a plurality of operating environments having different background noise according to embodiments of the present invention. Testing a grammar used in speech recognition for reliability in a plurality of operating environments having different background noise according to the method of FIG. 6 is carried out by a grammar analysis module (132) installed upon a laboratory server in a laboratory environment. Readers will note, however, that such an example is for explanation only and not for limitation. In fact, any computer as will occur to those of skill in the art may also be useful according to embodiments of the present invention.

The method of FIG. 6 includes receiving (600) recorded background noise (142) for each of the plurality of operating environments. Each recorded background noise (142) of FIG. 6 represents a waveform of the background sounds in a particular operating environment. In some embodiments, the grammar analysis module (132) may receive (600) recorded background noise (142) for each of the plurality of operating environments by sampling the background sounds in multiple operating environments and digitizing the sampled background sounds according to any codec as will occur to those of skill in the art. For example, a multimodal application designer may record the background sounds of the inside a particular vehicle traveling at thirty miles per hour, fifty miles per hour, and seventy miles per hour. In such an example, the multimodal application designer incurs the costs of setting up recording equipment capturing the background noise (142) for each operating environment only once. The multimodal application designer may then reuse the recorded background noise (142) for testing any number of grammars according to embodiments of the present invention. In some other embodiments, the grammar analysis module (132) may receive (600) recorded background noise (142) for each of the plurality of operating environments by purchasing the background noises (142) for the different operating environments under test from a background noise provider. For example, background noises (142) for a wide variety of operating environments may be provided as part of a speech integrated development environment such as, for example, the IBM® Voice Toolkit.

The method of FIG. 6 also includes generating (602) a test speech utterance (604) for recognition by a speech recognition engine using a grammar (104). The test speech utterance (604) of FIG. 6 represents a speech waveform of a speech response that a speech engine should recognize using a particular grammar under test. The grammar analysis module (132) may generate (602) a test speech utterance (604) according to the method of FIG. 6 by sampling the test speech utterance (604) from speech of a person. In other embodiments, the grammar analysis module (132) may generate (602) a test speech utterance (604) according to the method of FIG. 6 by synthesizing the test speech utterance (604) using a text-to-speech engine.

The method of FIG. 6 includes mixing (606) the test speech utterance (604) with each recorded background noise (142), resulting in a plurality of mixed test speech utterances (608). Accordingly, each mixed test speech utterance (608) of FIG. 6 has a different background noise (142). The grammar analysis module (132) may mix (606) the test speech utterance (604) with each recorded background noise (142) according to the method of FIG. 6 by combining, for each recorded background noise (142), the test speech utterance (604) with that background noise (142) to form a single mixed test speech utterance (608). The grammar analysis module (132) may combine the test speech utterance (604) with each background noise (142) by balancing the relative amplitude, frequencies, and other components of the test speech utterance (604) and the background noises (142) before summing the test speech utterance (604) and the background noises (142) together to form the mixed test speech utterances (608).

The method of FIG. 6 includes performing (610), for each of the mixed test speech utterances (608), speech recognition using the grammar (104) and the mixed test speech utterance (608), resulting in speech recognition results (612) for each of the mixed test speech utterances (608). The grammar analysis module (132) may perform (610) speech recognition for each of the mixed test speech utterances (608) using the grammar (104) according to the method of FIG. 6 by passing the mixed test speech utterances (608) and the grammar (104) to a speech engine for processing. The speech engine in turn identifies speech waveform representations associated with the phonemes for the words in the grammar (104), compares those speech waveform representations with the waveform representations in the mixed test speech utterances (608) to identify the words in the grammar (104) that result in the closest match, and passes the speech recognition results (612) back to the grammar analysis module (132) using, for example, an ECMAScript data structure such as the 'application.lastresult$' array. ECMAScript data structures represent objects in the Document Object Model ('DOM') at the scripting level in an X+V page. The DOM is created by a multimodal browser or a grammar analysis module when an X+V page is loaded. The 'application.lastresult$' array holds information about the last recognition generated by a speech engine. The 'application.lastresult$' is an array of elements where each element, application.lastresult$[i], represents a possible result through the following shadow variables:

application.lastresult$[i].confidence, which specifies the confidence level for this recognition result. A value of 0.0 indicates minimum confidence, and a value of 1.0 indicates maximum confidence.

application.lastresult$[i].utterance, which is the raw string of words that compose this recognition result. The exact tokenization and spelling is platform-specific (e.g. "five hundred thirty" or "5 hundred 30" or even "530").

application.lastresult$[i].inputmode, which specifies the mode in which the user provided the voice utterance. Typically, the value is voice for a voice utterance.

application.lastresult$[i].interpretation, which is an ECMAScript variable containing output from ECMAScript post-processing script typically used to reformat the value contained in the 'utterance' shadow variable.

When a voice interpreter stores the recognition results in an ECMAScript field variable array for a field specified in the multimodal application, the recognition results (506) may be stored in field variable array using shadow variables similar to the application variable 'application.lastresult$.' For example, a field variable array may represent a possible recognition result through the following shadow variables:

name$[i].confidence,
name$[i].utterance,
name$[i].inputmode, and
name$[i].interpretation, where 'name$' is a placeholder for the field identifier for a ECMAScript variable specified to store the speech recognition results.

The grammar analysis module (132) may often perform speech recognition with each mixed text speech utterance (608) multiple times to test the reliability of the grammar with a particular background noise (142). Accordingly, the grammar analysis module (132) of FIG. 6 repeatedly performs, for each of the mixed test speech utterances (608), the speech recognition using the grammar (104) and that mixed test speech utterance (608), resulting in a plurality of speech recognition results (612) for each mixed test speech utterance (608). For further explanation, consider the following exemplary grammar under test that specifies all of the cities in the state of Texas:

```
01:   <vxml:grammar>
02:     <![CDATA[
03:       #JSGF V1.0;
04:       grammar cities_in_TX;
05:       public <cities_in_TX> = Abbott | Abercrombie | Abernathy |
06:         Abilene | Ace | Ackerly | Addison | Adkins | Adrian |
07:         Afton | Alamo | Alamo Heights | Albany | Alice | Allen |
08:         Alpine | Alton | Alvarado | Alvin | Amarillo | Ames |
09:         Anahuac | Anderson Mill | Angleton | Appleby |
10:         Aransas Pass | Archer City | Argyle | Arlington ... ;
11:     ]]>
12:   </vxml:grammar>
```

Further consider that each mixed test speech utterance (608) has a unique identifier and specifies the city 'Alton' with the background noise (142) for a different operating environment. The grammar analysis module (132) may store the exemplary speech recognition results in the following table:

TABLE 1

EXEMPLARY RECOGNITION RESULTS

| MIXED TEST SPEECH UTTERANCE ID | RECOGNITION RESULTS |
|---|---|
| 0 | Alton |
| 0 | Alton |
| 0 | Alton |
| 0 | Alton |
| 0 | Alton |
| 1 | Alton |
| 1 | Alpine |
| 1 | Alton |
| 1 | Afton |
| 1 | Alton |
| 2 | Allen |
| 2 | Alton |
| 2 | Afton |
| 2 | Afton |
| 2 | Alpine |
| ... | ... |

Table 1 above illustrates recognition results provided by a speech engine using the exemplary grammar above and three mixed test speech utterances having identifiers 0, 1, and 2. The exemplary speech recognition results above indicates that the speech engine successfully recognizes the test speech utterance 'Alton' mixed with background noise for a first operating environment five times using the exemplary grammar above. The exemplary speech recognition results above indicates that the speech engine successfully recognizes the test speech utterance 'Alton' mixed with background noise for a second operating environment three times using the exemplary grammar above. The exemplary speech recognition results above indicates that the speech engine successfully recognizes the test speech utterance 'Alton' mixed with background noise for a third operating environment only one time using the exemplary grammar above. Readers will note that the exemplary recognition results table above is for explanation only and not for limitation.

The method of FIG. 6 also includes evaluating (614), for each recorded background noise (142), speech recognition reliability of the grammar (104) in dependence upon the speech recognition results (612) for the mixed test speech utterance (608) having that recorded background noise (142). The grammar analysis module may evaluate (614) speech recognition reliability of the grammar (104) for each recorded background noise (142) according to the method of FIG. 6 by calculating, in dependence upon the plurality of speech recognition results (612) for each one of the mixed test speech utterance (608), a reliability indicator (622) for the grammar (104) when recognizing speech having the recorded background noise (142) included in that mixed test speech utterance (608). The grammar analysis module (132) may calculate the reliability indicator (622) by dividing the number of times the speech engine successfully recognized the test speech utterance (604) amid the background noise (142) for a mixed test speech utterance (608) by the number of times the speech engine did not successfully recognize the test speech utterance (604).

For example consider again the exemplary grammar above, the exemplary test speech utterance 'Alton,' and the exemplary recognition results from Table 1 above. The reliability indicator for the exemplary grammar and the background noise for the first operating environment—that is, the background noise embedded in the mixed test speech utterance having an identifier of '0'—is one hundred percent (or 1.00). The reliability indicator for the exemplary grammar and the background noise for the second operating environment—that is, the background noise embedded in the mixed test speech utterance having an identifier of '1'—is sixty percent (or 0.60). The reliability indicator for the exemplary grammar and the background noise for the third operating environment—that is, the background noise embedded in the mixed test speech utterance having an identifier of '2'—is twenty percent (or 0.20).

As part of evaluating (614) speech recognition reliability according to the method of FIG. 6, the grammar analysis module (132) of FIG. 6 stores the reliability indicator (622) in a grammar reliability table (616). Each record of the grammar reliability table (616) specifies a reliability indicator (622) for using a grammar to recognize speech in the presence of background noise for a particular operating environment. The grammar associated with a particular reliability indicator is specified using a grammar identifier (620). The background noise associated with a particular reliability indicator is specified using a background noise identifier (618), which also indirectly specifies a particular operating environment. In some embodiments, an operating environment identifier may be substituted for or augment the background noise identifier (618). For further explanation of the grammar reliability table (616), consider the following exemplary grammar reliability table:

TABLE 2

EXEMPLARY GRAMMAR RELIABLITY TABLE

| BACKGROUND NOISE ID | GRAMMAR ID | RELIABILITY INDICATOR |
|---|---|---|
| 0 | cities_in_TX | 1.00 |
| 1 | cities_in_TX | 0.60 |
| 2 | cities_in_TX | 0.20 |
| 0 | counties_in_TX | 1.00 |
| 1 | counties_in_TX | 0.80 |
| 2 | counties_in_TX | 1.00 |
| 0 | cities_in_Hidalgo_TX | 1.00 |
| 1 | cities_in_Hidalgo_TX | 1.00 |
| 2 | cities_in_Hidalgo_TX | 1.00 |

The exemplary grammar reliability table above specifies that the exemplary 'cities_in_TX' grammar above has a reliability of one hundred percent when utilized to recognize speech recorded in an operating environment with a background noise that matches the background noise having an identifier of '0,' a reliability of sixty percent when utilized to recognize speech recorded in an operating environment with a background noise that matches the background noise having an identifier of '1,' and a reliability of twenty percent when utilized to recognize speech recorded in an operating environment with a background noise that matches the background noise having an identifier of '2.' The exemplary grammar reliability table above also specifies that an exemplary 'counties_in_TX' grammar has a reliability of one hundred percent when utilized to recognize speech recorded in an operating environment with a background noise that matches the background noise having an identifier of either '0' or '2,' and a reliability of eighty percent when utilized to recognize speech recorded in an operating environment with a background noise that matches the background noise having an identifier of '1.' The exemplary grammar reliability table above also specifies that an exemplary 'cities_in_Hidalgo_TX' grammar has a reliability of one hundred percent when utilized to recognize speech recorded in an operating environment with a background noise that matches any o the background noises having an identifier of '0,' '1,' or '2.'

Reader will note that the exemplary grammar reliability table above is for explanation only and not for limitation. Other values and formats for associating a reliability indicator with a grammar and a background noise or operating environment as will occur to those of skill the art may also be useful in embodiments of the present invention.

As mentioned above, a multimodal application may utilize grammars tested according to embodiments of the present invention to perform reliable speech recognition. For further explanation, FIG. 7 sets forth a flow chart illustrating an exemplary method of a multimodal application utilizing one of a plurality of grammars tested for reliability in a plurality of operating environments having different background noise according to embodiments of the present invention. The multimodal application (195) of FIG. 7 operates on a multimodal device supporting multiple modes of interaction that include a voice mode and one or more non-voice modes such as a visual mode or tactile mode. The voice mode of interaction may be implemented using speakers or a microphone of the multimodal device along with a sound card to provide an interface for the speakers or the microphone with the remaining components of the device. The visual mode of interaction may be implemented using a display for the multimodal device on which the device may render a graphical user interface ('GUI') along with a graphic card that provides an interface for the display with the other components of the multimodal device.

Figure 7:
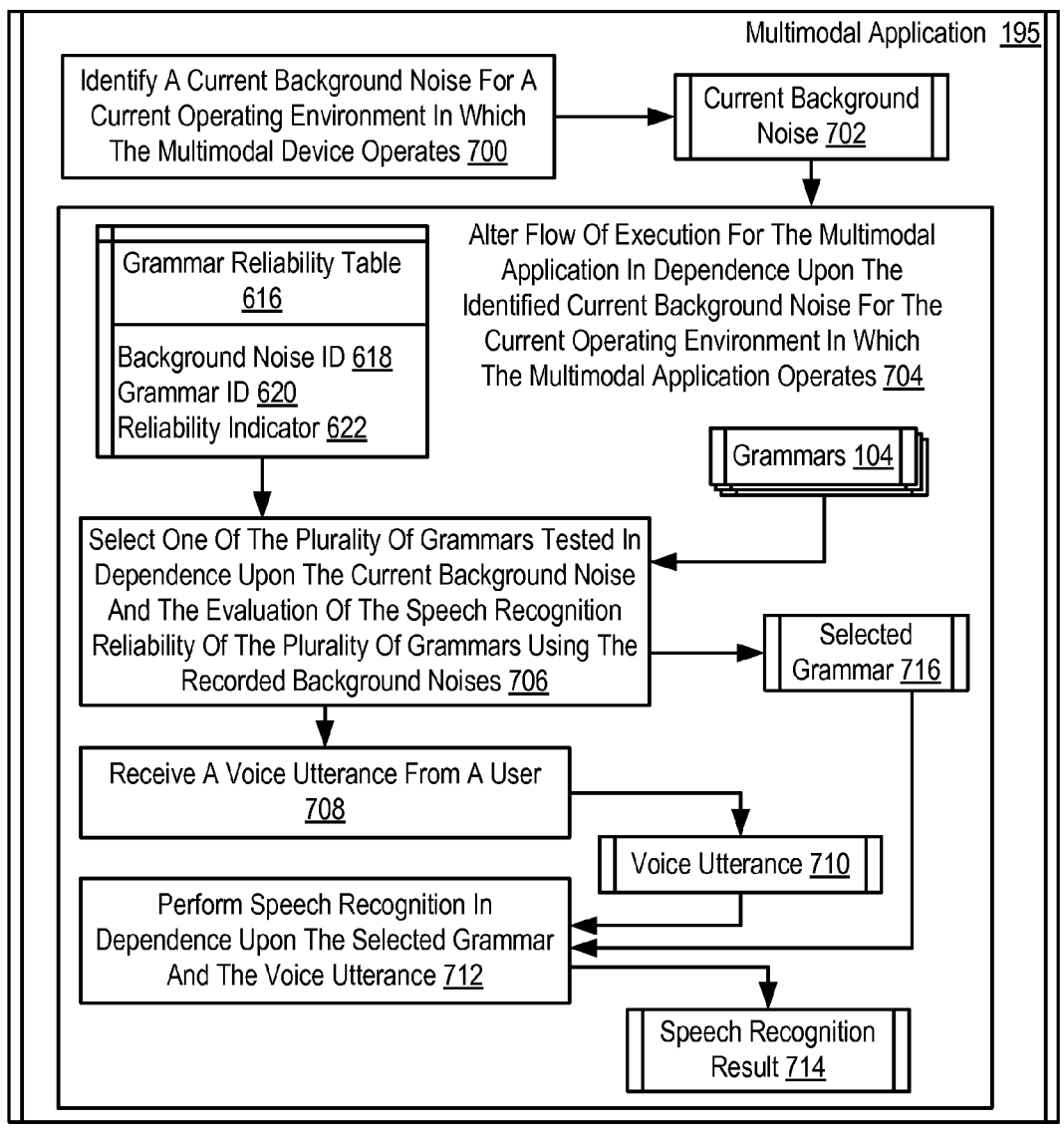
FIG. 7 sets forth a flow chart illustrating an exemplary method of a multimodal application utilizing one of a plurality of grammars tested for reliability in a plurality of operating environments having different background noise according to embodiments of the present invention.

The method of FIG. 7 includes identifying (700), by the multimodal application (195), a current background noise (702) for a current operating environment in which the multimodal device operates. The multimodal application (195) may identify (700) a current background noise (702) for a current operating environment in which the multimodal device operates according to the method of FIG. 7 by sampling, through the microphone, the background sounds for the current operating environment. The multimodal application (195) may sample background sounds for the current operating environment by periodically, or at a predetermined time, determining the lack of any foreground noise and digitizing the background sounds for the current environment in which the multimodal application (195) is operating. The predetermined time period at which the multimodal application samples the background sounds may be a static time period or a time period that is dynamically generated. For example, the predetermined time period may specify sampling the background sounds every five minutes, three minutes after the most recent user interaction with the multimodal device, and so on. Because foreground noise generally results in a sudden change in the input to a microphone, the multimodal application (195) may determine the lack of any foreground noise by identifying over a period of time when the input to the microphone does not vary beyond a predefined threshold. The period of time used to identify the lack of any foreground noise may be a several milliseconds, several seconds, or any other time period as will occur to those of skill in the art.

In some embodiments, the multimodal application (195) may sample the background noise while a user is not interacting with the multimodal device to avoid having additional noise from the user interaction included the current background noise (702) for the current operating environment. In other embodiments, the multimodal application (195) may sample the current background noise (702) while the user is interacting with the device. For example, the multimodal application (195) may sample the current background noise (702) immediately before or after the user provides a voice utterance for speech recognition.

The method of FIG. 7 includes altering (704), by the multimodal application (195), flow of execution for the multimodal application (195) in dependence upon the identified current background noise (702) for the current operating environment in which the multimodal application (195) operates. The multimodal application (195) may alter (704) flow of execution for the multimodal application (195) according to the method of FIG. 7 by using different voice dialogs depending on the current background noise (702) identified. The multimodal application (195) may select a voice dialog for processing using the grammar reliability table (616) of FIG. 7. The multimodal application (195) may select the voice dialog that utilizes the grammar associated with the highest reliability indicator (622) and with the background noise that most closely matches the current background noise (702). Determining which background noise specified by the grammar reliability table (616) most closely matches the current background noise (702) may be carried out using Hidden Markov Models of the background noise to compare the probability that the current background noise (702) matches each of the background noises specified by identifiers (618) in the grammar reliability table (616). The background noise specified in the grammar reliability table (616) to which the current background noise (702) has the highest probability of matching may be identified as the background noise that most closely matches the current background noise (702).

For further example of altering (704) the multimodal application's flow of execution, consider a multimodal application that operates in a user's vehicle to provide driving direction to any city in Texas from the vehicle's current location. Further consider that the multimodal application provides two different interactions with a user depending on the vehicle's speed. The first user interaction allows the user to speak the name of the city in Texas, and the multimodal application in turn provides directions to that city. In this example, the grammar used to recognize the names of all of the cities in Texas has a high reliability in the presence of background noise as long as the current operating environment is such that the vehicle is traveling less than forty miles per hour. For operating environments above forty miles per hour, the grammars reliability diminishes as the noise makes distinguishing between cities with similar sounding names difficult. The multimodal application therefore provides a second user interaction when the current background noise indicates that the user is in an operating environment where the vehicle is traveling above forty mile per hour. This second user interaction prompts the user for the county in which the desired city is located. The multimodal application utilizes a grammar that specifies all of the counties in Texas to recognize the county spoken by the user. The multimodal application then dynamically builds a grammar for recognizing the cities in that county and prompts the user to provide the name of the city. Because a grammar that lists the cities for only a single county typically has a lot less cities with similar sounding names than a grammar listing all of the cities in Texas, the additional noise from operating the vehicle at a higher speed does not impair the multimodal application's ability to reliably perform speech recognition in the second user interaction in the same manner that the speech recognition reliability during the first user interaction is impaired.

In the method of FIG. 7, altering (704) the multimodal application's flow of execution includes selecting (706) one (716) of the plurality of grammars (104) tested in dependence upon the current background noise (702) and the evaluation of the speech recognition reliability of the plurality of grammars (104) using the recorded background noises. The multimodal application (195) may select (706) one (716) of the plurality of grammars (104) according to the method of FIG. 7 by selecting the grammar (716) in the grammar reliability table (616) associated with the highest reliability indicator (622) and with the background noise that most closely matches the current background noise (702). Generally in operating environments having less background noise, the grammar selected may provide the user with more flexibility to speak naturally or with less prompting than the grammars selected in operating environments having more background noise. Such is generally the case because lower noise levels typically allow a speech engine to distinguish more accurately among more words or phrases spoken by user.

Altering (704) the multimodal application's flow of execution according to the method of FIG. 7 also includes receiving (708) a voice utterance (710) from a user. The multimodal application (195) may receive (708) a voice utterance (710) from a user by recording a speech waveform through a microphone and digitizing and encoding the speech waveform for speech recognition using a codec implemented in the multimodal device.

In the method of FIG. 7, altering (704) the multimodal application's flow of execution includes performing (712), by the multimodal application (195), speech recognition in dependence upon the selected grammar (716) and the voice utterance (710). The multimodal application (195) may perform (712) speech recognition in dependence upon the selected grammar (716) and the voice utterance (710) according to the method of FIG. 7 by passing the selected grammar (716) and the voice utterance (710) to a speech engine and receiving the recognition results in a ECMAScript data structure such as, for example, the 'application.lastresult$' array. By altering (704) the multimodal application's flow of execution in such a manner, the multimodal application may obtain more accurate speech recognition results using grammars tested for reliability in a plurality of operating environments having different background noise according to embodiments of the present invention.

Exemplary embodiments of the present invention are described largely in the context of a fully functional computer system for testing a grammar used in speech recognition for reliability in a plurality of operating environments having different background noise. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of testing a grammar used in speech recognition for reliability in a plurality of operating environments having different background noise, the method comprising:
   receiving recorded background noise for each of the plurality of operating environments;
   generating a test speech utterance for recognition by a speech recognition engine using a grammar;
   mixing the test speech utterance with each recorded background noise, resulting in a plurality of mixed test speech utterances, each mixed test speech utterance having different background noise;
   performing, for each of the mixed test speech utterances, speech recognition using a device having an automated speech recognition engine, the grammar and the mixed test speech utterance, resulting in speech recognition results for each of the mixed test speech utterances; and
   evaluating, for each recorded background noise, speech recognition reliability of the grammar in dependence upon the speech recognition results for the mixed test speech utterance having that recorded background noise.

2. The method of claim 1 wherein:
   performing, for each of the mixed test speech utterances, speech recognition using the grammar and the mixed test speech utterance, resulting in speech recognition results for each of the mixed test speech utterances further comprises repeatedly performing, for one of the mixed test speech utterances, the speech recognition using the grammar and the one of the mixed test speech utterances, resulting in a plurality of speech recognition results for the one of the mixed test speech utterances; and
   evaluating, for each recorded background noise, speech recognition reliability of the grammar in dependence upon the speech recognition results for the mixed test speech utterance having that recorded background noise further comprises calculating, in dependence upon the plurality of speech recognition results for the one of the mixed test speech utterances, a reliability indicator for the grammar when recognizing speech having the recorded background noise included in the one of the mixed test speech utterances.

3. The method of claim 1 wherein generating a test speech utterance for recognition by a speech recognition engine using a grammar further comprises sampling the test speech utterance from speech of a person.

4. The method of claim 1 wherein generating a test speech utterance for recognition by a speech recognition engine using a grammar further comprises synthesizing the test speech utterance using a text-to-speech engine.

5. The method of claim 1 wherein testing a grammar used in speech recognition for reliability in a plurality of operating environments having different background noise further comprises testing a plurality of grammars for use in speech recognition for a multimodal application, the multimodal application operating on a multimodal device supporting multiple modes of interaction that include a voice mode and one or more non-voice modes, the method further comprising:
- identifying, by the multimodal application, a current background noise for a current operating environment in which the multimodal device operates; and
- altering, by the multimodal application, flow of execution for the multimodal application in dependence upon the identified current background noise for the current operating environment in which the multimodal application operates.

6. The method of claim 5 wherein altering, by the multimodal application, flow of execution for the multimodal application in dependence upon the identified current background noise for the current operating environment in which the multimodal application operates further comprises:
- selecting, by the multimodal application, one of the plurality of grammars tested in dependence upon the current background noise and the evaluation of the speech recognition reliability of the plurality of grammars using the recorded background noises;
- receiving, by the multimodal application, a voice utterance from a user; and
- performing, by the multimodal application, speech recognition in dependence upon the selected grammar and the voice utterance.

7. A system for testing a grammar used in speech recognition for reliability in a plurality of operating environments having different background noise, the system comprising:
- one or more computer processors; and
- computer memory operatively coupled to the one or more computer processors, the computer memory having disposed within it computer program instructions that, when executed by the one or more computer processors, perform acts of:
- receiving recorded background noise for each of the plurality of operating environments;
- generating a test speech utterance for recognition by a speech recognition engine using a grammar;
- mixing the test speech utterance with each recorded background noise, resulting in a plurality of mixed test speech utterances, each mixed test speech utterance having different background noise;
- performing, for each of the mixed test speech utterances, speech recognition using the grammar and the mixed test speech utterance, resulting in speech recognition results for each of the mixed test speech utterances; and
- evaluating, for each recorded background noise, speech recognition reliability of the grammar in dependence upon the speech recognition results for the mixed test speech utterance having that recorded background noise.

8. The system of claim 7 wherein:
performing, for each of the mixed test speech utterances, speech recognition using the grammar and the mixed test speech utterance, resulting in speech recognition results for each of the mixed test speech utterances further comprises repeatedly performing, for one of the mixed test speech utterances, the speech recognition using the grammar and one of the the mixed test speech utterances, resulting in a plurality of speech recognition results for the mixed test speech utterances; and
evaluating, for each recorded background noise, speech recognition reliability of the grammar in dependence upon the speech recognition results for the mixed test speech utterance having that recorded background noise further comprises calculating, in dependence upon the plurality of speech recognition results for the one of the mixed test speech utterances, a reliability indicator for the grammar when recognizing speech having the recorded background noise included in the one of the mixed test speech utterances.

9. The system of claim 7 wherein generating a test speech utterance for recognition by a speech recognition engine using a grammar further comprises sampling the test speech utterance from speech of a person.

10. The system of claim 7 wherein generating a test speech utterance for recognition by a speech recognition engine using a grammar further comprises synthesizing the test speech utterance using a text-to-speech engine.

11. The system of claim 7 wherein testing a grammar used in speech recognition for reliability in a plurality of operating environments having different background noise further comprises testing a plurality of grammars for use in speech recognition for a multimodal application, the multimodal application operating on a multimodal device supporting multiple modes of interaction that include a voice mode and one or more non-voice modes, and wherein the computer memory has disposed within it computer program instructions capable of:
- identifying a current background noise for a current operating environment in which the multimodal device operates; and
- altering flow of execution for the multimodal application in dependence upon the identified current background noise for the current operating environment in which the multimodal application operates.

12. The system of claim 11 wherein altering flow of execution for the multimodal application in dependence upon the identified current background noise for the current operating environment in which the multimodal application operates further comprises:
- selecting one of the plurality of grammars tested in dependence upon the current background noise and the evaluation of the speech recognition reliability of the plurality of grammars using the recorded background noises;
- receiving a voice utterance from a user; and
- performing speech recognition in dependence upon the selected grammar and the voice utterance.

13. A computer program product comprising at least one non-transitory computer readable medium encoded with a plurality of instructions for testing a grammar used in speech recognition for reliability in a plurality of operating environments having different background noise, the instructions, when executed, perform acts of:
- receiving recorded background noise for each of the plurality of operating environments;
- generating a test speech utterance for recognition by a speech recognition engine using a grammar;
- mixing the test speech utterance with each recorded background noise, resulting in a plurality of mixed test speech utterances, each mixed test speech utterance having different background noise;
- performing, for each of the mixed test speech utterances, speech recognition using the grammar and the mixed test speech utterance, resulting in speech recognition results for each of the mixed test speech utterances; and
- evaluating, for each recorded background noise, speech recognition reliability of the grammar in dependence upon the speech recognition results for the mixed test speech utterance having that recorded background noise.

14. The computer program product of claim 13 wherein:
performing, for each of the mixed test speech utterances, speech recognition using the grammar and the mixed test speech utterance, resulting in speech recognition results for each of the mixed test speech utterances further comprises repeatedly performing, for one of the mixed test speech utterances, the speech recognition using the grammar and the one of the mixed test speech utterances, resulting in a plurality of speech recognition results for one of the mixed test speech utterances; and
evaluating, for each recorded background noise, speech recognition reliability of the grammar in dependence upon the speech recognition results for the mixed test speech utterance having that recorded background noise further comprises calculating, in dependence upon the plurality of speech recognition results for the one of the mixed test speech utterances, a reliability indicator for the grammar when recognizing speech having the recorded background noise included in the one of the mixed test speech utterances.

15. The computer program product of claim 13 wherein generating a test speech utterance for recognition by a speech recognition engine using a grammar further comprises sampling the test speech utterance from speech of a person.

16. The computer program product of claim 13 wherein generating a test speech utterance for recognition by a speech recognition engine using a grammar further comprises synthesizing the test speech utterance using a text-to-speech engine.

17. The computer program product of claim 13 wherein testing a grammar used in speech recognition for reliability in a plurality of operating environments having different background noise further comprises testing a plurality of grammars for use in speech recognition for a multimodal application, the multimodal application operating on a multimodal device supporting multiple modes of interaction that include a voice mode and one or more non-voice modes, the method further comprising:
identifying, by the multimodal application, a current background noise for a current operating environment in which the multimodal device operates; and
altering, by the multimodal application, flow of execution for the multimodal application in dependence upon the identified current background noise for the current operating environment in which the multimodal application operates.

18. The computer program product of claim 17 wherein altering, by the multimodal application, flow of execution for the multimodal application in dependence upon the identified current background noise for the current operating environment in which the multimodal application operates further comprises:
selecting, by the multimodal application, one of the plurality of grammars tested in dependence upon the current background noise and the evaluation of the speech recognition reliability of the plurality of grammars using the recorded background noises;
receiving, by the multimodal application, a voice utterance from a user; and
performing, by the multimodal application, speech recognition in dependence upon the selected grammar and the voice utterance.

\* \* \* \* \*

UNITED STATES PATENT AND TRADEMARK OFFICE
CERTIFICATE OF CORRECTION

PATENT NO. : 8,082,148 B2
APPLICATION NO. : 12/109204
DATED : December 20, 2011
INVENTOR(S) : Agapi et al.

It is certified that error appears in the above-identified patent and that said Letters Patent is hereby corrected as shown below:

At column 29, claim 8, line 60, "one of the the" should read --the one of the--.

Signed and Sealed this
Twenty-seventh Day of March, 2012

David J. Kappos
*Director of the United States Patent and Trademark Office*